(12) United States Patent
Ahn et al.

(10) Patent No.: US 9,474,131 B2
(45) Date of Patent: Oct. 18, 2016

(54) LIGHTING DEVICE, LIGHTING SYSTEM AND WEARABLE DEVICE HAVING IMAGE PROCESSOR

(71) Applicant: LG ELECTRONICS INC., Seoul (KR)

(72) Inventors: Sunghoon Ahn, Seoul (KR); Inhwan Ra, Seoul (KR); Kyungtae Ro, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/644,793

(22) Filed: Mar. 11, 2015

(65) Prior Publication Data

US 2015/0319826 A1    Nov. 5, 2015

(30) Foreign Application Priority Data

May 2, 2014    (KR) .......................... 10-2014-0053488

(51) Int. Cl.
  *H05B 37/02* (2006.01)
  *G02B 27/28* (2006.01)
  *G02B 27/01* (2006.01)

(52) U.S. Cl.
  CPC ...... *H05B 37/0227* (2013.01); *H05B 37/0272* (2013.01); *G02B 27/0172* (2013.01); *G02B 27/281* (2013.01)

(58) Field of Classification Search
  CPC .................... G06T 2207/10024; G06T 7/004

USPC ......... 315/149–159, 247, 185 S, 209 R, 224, 315/291, 307–326; 359/381, 379, 385, 390, 359/387, 630
See application file for complete search history.

(56) References Cited

U.S. PATENT DOCUMENTS

| 2015/0062323 A1* | 3/2015 | Gustafsson | G06F 3/013 348/78 |
| 2015/0123991 A1* | 5/2015 | Yarosh | G02B 27/017 345/629 |
| 2016/0037137 A1* | 2/2016 | Seiflein | H04N 7/185 348/158 |

FOREIGN PATENT DOCUMENTS

| JP | H11-070078 | 3/1999 |
| WO | WO 2013/019890 A1 | 4/2013 |

OTHER PUBLICATIONS

European Search Report for Application 15158283.0 dated Dec. 22, 2015.

* cited by examiner

*Primary Examiner* — Tuyet Vo
(74) *Attorney, Agent, or Firm* — KED & Associates LLP

(57) ABSTRACT

A lighting system includes: a plurality of lighting devices each including one or more light emitting units; and an integrated control module; and an integrated control module that communicates with the wearable device with at least one camera, receives an image of a user's eye captured by the camera, detects a pupil image based on the image, and controls the number of lighting devices to be activated among the plurality of lighting devices based on the pupil image.

14 Claims, 24 Drawing Sheets

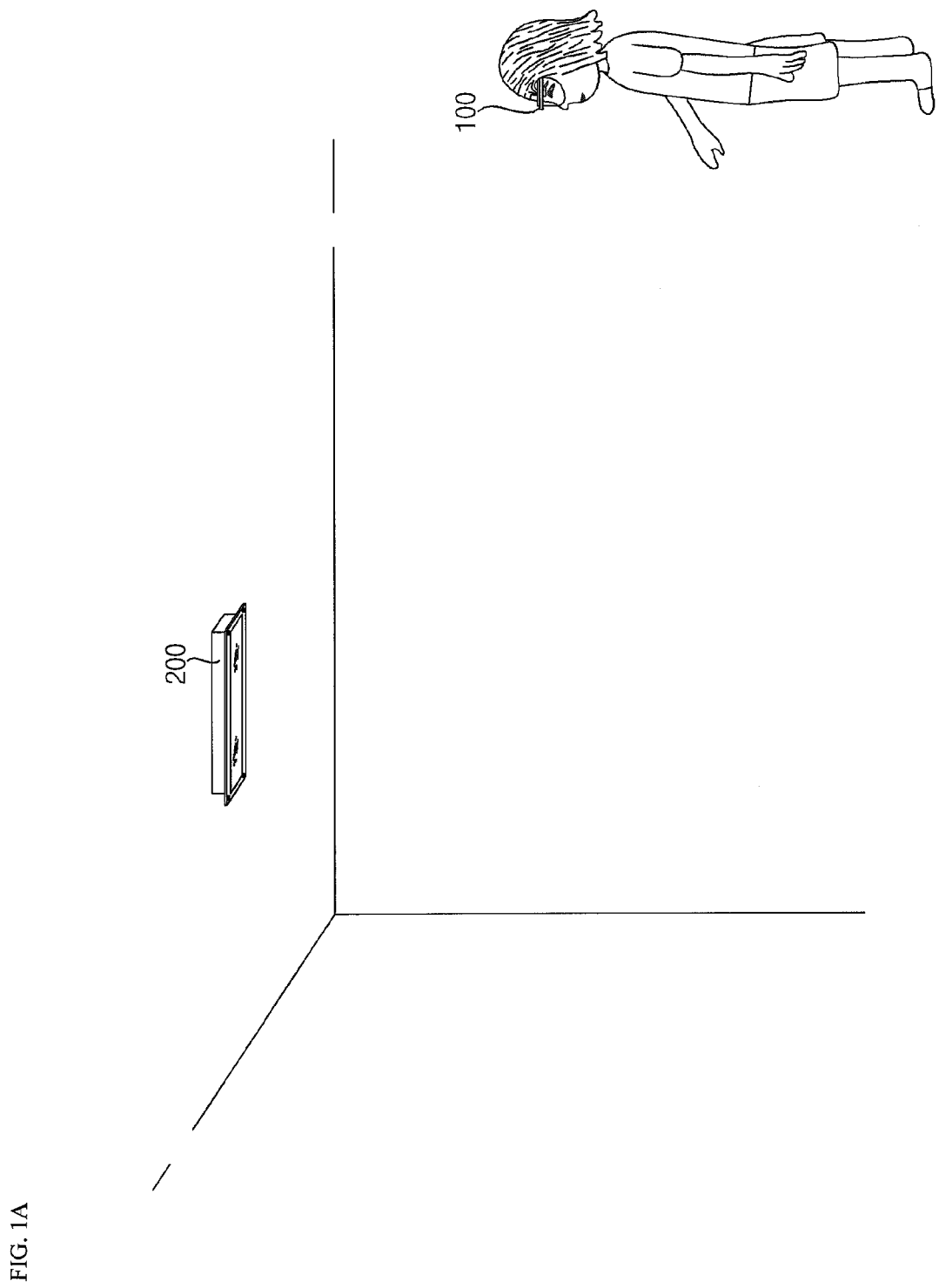

(a)

(b)

LIGHTING DEVICE, LIGHTING SYSTEM AND WEARABLE DEVICE HAVING IMAGE PROCESSOR

CROSS-REFERENCE TO RELATED APPLICATION

This application claims priority under 35 U.S.C. §119 to Korean Application No. 10-2014-0053488 filed on May 2, 2014, whose entire disclosure is hereby incorporated by reference.

BACKGROUND

1. Field

The present invention relates to a lighting system and a control method thereof which allow for lighting control based on images of a user's eye.

2. Background

The lighting industry has continued to grow over the years. A lot of research on light sources, light emission methods, operation methods, efficiency improvement is under way in connection with the lighting industry.

Light sources currently used mainly for illumination include incandescent lamps, discharge lamps, and fluorescent lamps. Lighting using these light sources is used for various purposes such as home lighting, landscape lighting, industrial lighting, etc. Resistant light sources, such as the incandescent lamps, may have the problems of poor efficiency and heat generation. The discharge lamps may have the problems of high price and high voltage. The fluorescent lamps may have environmental problems caused by the use of mercury.

There is growing interest in light emitting diode (LED) lighting to solve the drawbacks of light sources. The LED lighting has advantages in efficiency, color variability, design flexibility, etc.

The light emitting diode is a semiconductor device that emits light when a voltage is applied thereto in a forward direction. The light emitting diode may have long lifetime, low power consumption, and electric, optical and physical characteristics suitable for mass production, to rapidly replace incandescent lamps and fluorescent lamps.

Smart technologies are getting attention recently which provide a domestic ubiquitous environment where computing can occur anytime, in any place, and on any device by employing home networking and internet information home appliances based on wired/wireless communications and digital information appliances.

By combining smart technologies with lighting, technical advancements have been made in lighting control with a terminal when the lighting and the terminal are connected for communication. However, the user has to enter a command on the terminal to control the lighting using the terminal.

BRIEF DESCRIPTION OF THE DRAWINGS

The embodiments will be described in detail with reference to the following drawings in which like reference numerals refer to like elements wherein:

FIGS. 1a and 1b are views showing an environment where a lighting system according to an exemplary embodiment of the present invention is used;

DETAILED DESCRIPTION

Hereinafter the present invention will be described in detail with reference to the accompanying drawings.

In the following description, usage of suffixes such as 'module', 'unit' or 'unit' used for referring to elements is given merely to facilitate explanation of the present disclosure, without having any significant meaning by itself. Accordingly, both 'module' and 'unit' can be used in combination.

This specification will be described, focusing on, but not limited to, a glasses-type wearable device 100. The wearable device 100 refers to an electronic device that can be worn.

Figure 1B:
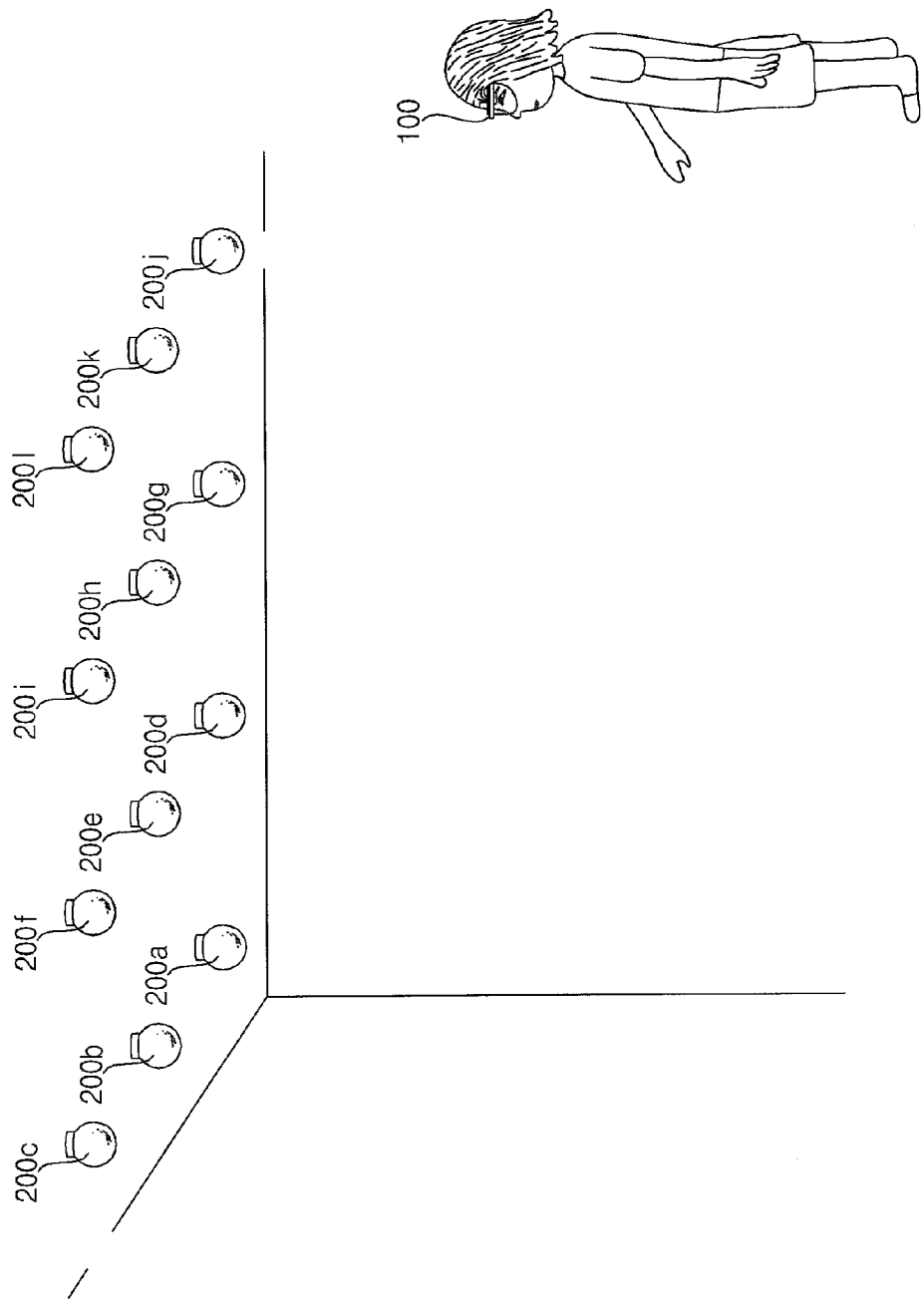

FIGS. 1a and 1b are views showing an environment where a lighting system according to an exemplary embodiment of the present invention is used.

Referring to FIG. 1a, a lighting system according to a first or second exemplary embodiment of the present invention includes a wearable device 100 and a lighting device 200.

The wearable device 100 has at least one camera. The wearable device 100 captures an image of an eye of a user wearing the wearable device 100. The wearable device 100 communicates with the lighting device 200. The wearable device 100 transmits the image of the user's eye to the lighting device 200.

The lighting device 200 communicates with the wearable device 100. The lighting device 200 receives the image of the user's eye from the wearable device 100. The lighting device 200 controls the level of illumination based on the received image of the user's eye.

Referring to FIG. 1b, a lighting system according to a third or fourth exemplary embodiment of the present invention includes a wearable device 100, an integrated control module, and a plurality of lighting devices 200 (200a to 200l). It should be made clear that FIG. 1b illustrates, but is not limited to, twelve lighting devices.

The wearable device 100 has at least one camera. The wearable device 100 captures an image of an eye of a user wearing the wearable device 100. The wearable device 100 communicates with the integrated control module. The wearable device 100 transmits the image of the user's eye to the integrated control module.

The integrated control module communicates with the wearable device 100. The integrated control module receives the image of the user's eye from the wearable device 100. The integrated control module controls the number of lighting devices 200 (200a to 200l) to be activated, based on the received image of the user's eye.

Figure 2:
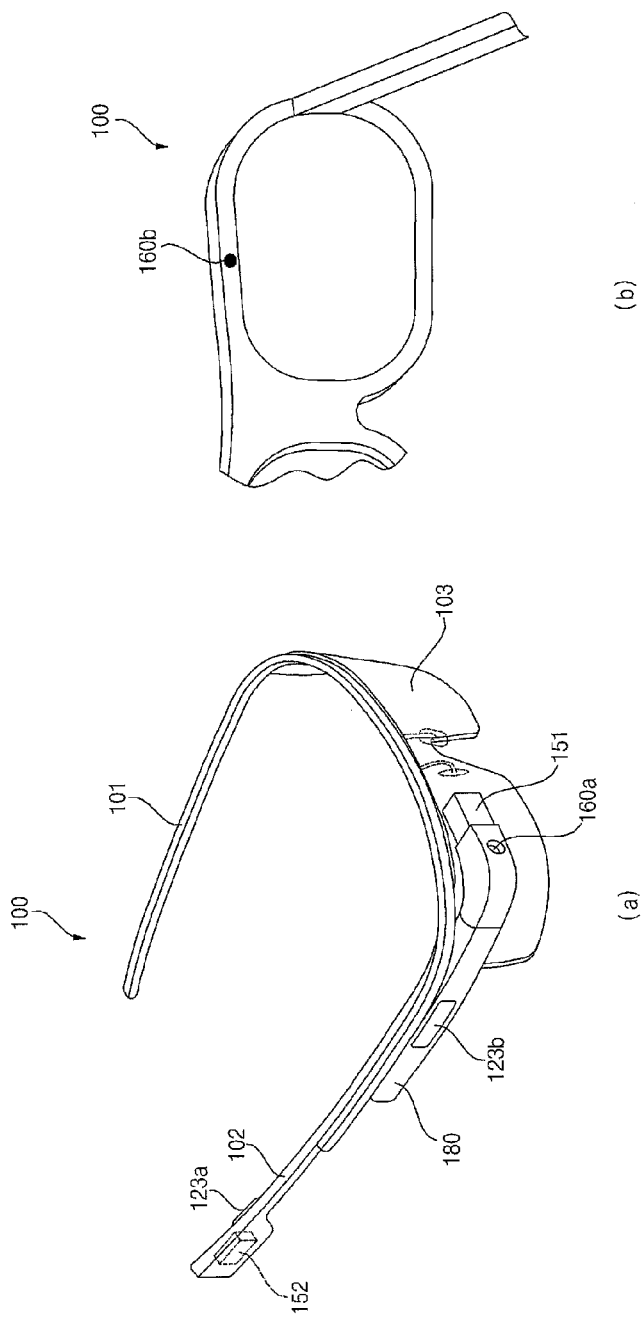
FIG. 2 is a view showing the wearable device according to the exemplary embodiment of the present invention.

FIG. 2 is a view showing the wearable device according to the exemplary embodiment of the present invention.

Referring to FIG. 2, the glasses-type wearable device 100 is configured to be worn on a human head. To this end, a frame unit (a case, a housing, etc.) may be provided. The frame unit may be formed of a flexible material to make it easy to wear. This figure illustrates that the frame unit includes a first frame 101 and a second frame 102 that are made of different materials.

The frame unit is supported on the head, and has a space where various components are mounted. As shown therein, electronic components such as a wearable device controller 180 and a sound output module 152 may be mounted on the frame unit. A lens 103 that covers at least one of the left and right eye regions may be detachably mounted on the frame unit.

The wearable device controller 180 is adapted to control various electronic components in the wearable device 100. This figure illustrates that the wearable device controller 180 is installed on one side of the frame unit on the head. However, the position of the wearable device controller 180 is not limited to the illustrated position.

The wearable device 100 includes a display unit 151 that receives a control command from the wearable device controller 180 and outputs it to a predetermined screen.

The wearable device 100 includes at least one camera 160. FIG. 2 illustrates that the wearable device 100 includes a first camera 160a and a second camera 160b.

This figure illustrates that the first camera 160a is provided on the wearable device controller 180 and the second camera 160b is provided on the frame unit in proximity to one of the user's eyes; however, the present invention is not limited to this illustrated example.

The glasses-type wearable device 100 may have user input units 123a and 123b that are manipulated to receive a control command. The user input units 123a and 123b can employ any method so long as they can be manipulated in a tactile manner like touching, pushing, etc. This figure illustrates that the frame unit and the wearable device controller 180 include push-and-touch type user input units 123a and 123b, respectively.

Moreover, the glasses-type wearable device 100 may have a microphone (not shown) that receives sound and processing it into electric audio data and a sound output module 152 that outputs sound. The sound output module 152 may be adapted to transmit sound by a typical sound output method or by bone conduction. When implemented by bone conduction, the sound output module 152 of the wearable device 100 worn on the user is tightly attached to the head, and transmits sound by vibrating the skull.

Figure 3:
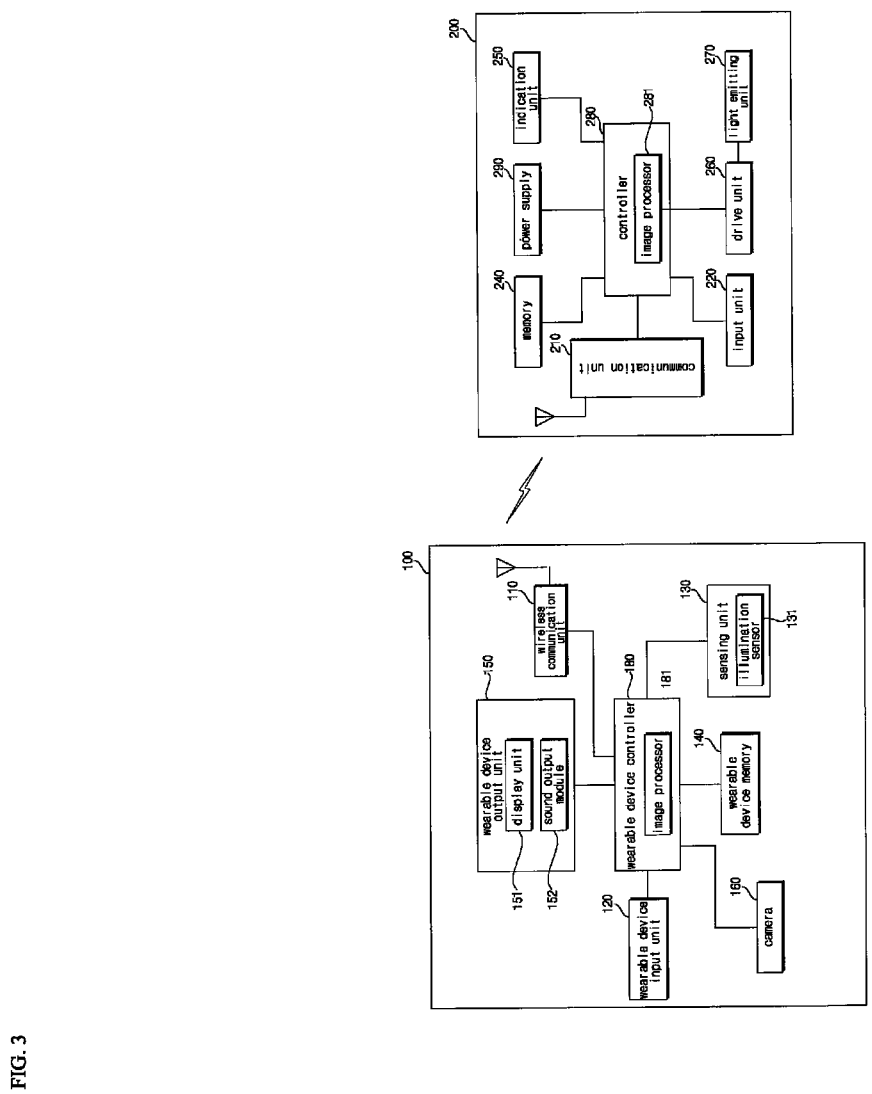
FIG. 3 is a block diagram showing the components of the lighting system according to the exemplary embodiment of the present invention.

FIG. 3 is a block diagram showing the components of the lighting system according to the exemplary embodiment of the present invention.

Referring to FIG. 3, the lighting system according to the first or second exemplary embodiment of the present invention may include a wearable device 100 and a lighting device 200.

The wearable device 100 may include a wireless communication unit 110, a wearable device input unit 120, a sensing unit 130, a wearable device memory 140, a wearable device output unit 150, and a wearable device controller 180.

The wireless communication unit 110 may include one or more modules that enable wireless communications between the wearable device 100 and the lighting device 200 or between the wearable device 100 and the integrated control module 300. Moreover, the wireless communication unit 110 may include one or more modules that connect the wearable device 100 to one or more communication networks.

The wireless communication unit 110 is able to communicate with the lighting device 200 over Bluetooth. Bluetooth allows for communication at low power and can be set up at low cost. Accordingly, Bluetooth is preferred for indoor short range communication between the wearable device 100 and the lighting device 200.

The wireless communication unit 110 may use communication protocols such as Wi-Fi Direct, RFID (Radio Frequency Identification), IrDA (Infrared Data Association), UWB (Ultra Wideband), ZigBee, and NFC (Near Field Communication), as well as Bluetooth.

The wireless communication unit 110 communicates with the lighting device 200, and transmits information sensed by the sensing unit 130 or an image captured by a camera 160 to the lighting device 200. Alternatively, the wireless communication unit 110 may transmit a control signal for controlling the lighting device 200 according to an exemplary embodiment.

The wearable device input unit 120 may include a camera 160 or image input unit for inputting an image signal, a microphone (not shown) or audio input unit for inputting an audio signal, and a user input unit (not shown, for example, a touch key or a mechanical key) for receiving information from the user. Audio data or image data collected by the wearable device input unit 120 may be analyzed and processed into a user's control command. For example, the wearable device controller 180 may control the wearable device 100 to receive the user's voice through the microphone and go into the first mode. The first mode may be a mode for controlling lighting based on an image of a user's eye (e.g., pupil image) while the wearable device 100 and the lighting device 200 are connected for communication.

The sensing unit 130 may include one or more sensors for sensing at least one of the following: information in the wearable device 100, information on the environment surrounding the wearable device 100, and user information.

For example, the sensing unit 130 may include at least one of the following: an illumination sensor 131, a motion sensor, an optical sensor (e.g., camera), a touch sensor, a proximity sensor, an acceleration sensor, a magnetic sensor, a G-sensor, a gyroscope sensor, an RGB sensor, an IR (infrared) sensor, a finger scan sensor, an ultrasonic sensor, a microphone, a battery gauge, an environment sensor (e.g., barometer, hygrometer, thermometer, radiation sensor, thermal sensor, or gas sensor), and a chemical sensor (e.g., electronic nose, health-care sensor, or biometric sensor). A mobile wearable device disclosed in this specification may use information sensed by at least two of these sensors in combination.

The illumination sensor 131 senses the level of illumination of surrounding light in a certain space. The illumination sensor 131 includes an element whose resistance changes depending on the intensity of the surrounding light. The illumination sensor 131 calculates variations of voltage or current caused by variations in the resistance of the element.

The wearable device memory 140 stores data that supports various functions of the wearable device 100. The wearable device memory 140 may store multiple application programs (or applications) that run on the wearable device 100 and data and commands for operating the wearable device 100. Moreover, the wearable device memory 140 may store image data acquired by the camera 160.

The wearable device output unit 150 is for producing output related to visual, auditory, and tactile senses. The wearable device output unit 150 may include at least one of a display unit 151, a sound output module 152, a haptic module (not shown), and a light output unit (not shown).

The display unit 151 may be implemented in the form of a head mounted display (HMD). A head-mounted display is a display device, worn on the head, that has a small display optic in front of the user's eyes. The display unit 151 may be located corresponding to at least one of the left and right eyes so that an image is provided in front of the user's eyes when the use is wearing the glasses-type wearable device 100.

The display unit 151 may project an image to the eyes through a prism. The prism may be translucent to enable the user to see the projected image together with the general view in front of the user (range of vision with the user's eyes).

As such, an image output through the display unit 151 can be seen overlapping the general view. Using this feature of the display unit, the wearable device 100 can provide augmented reality (AR) which shows a virtual image overlaid on an image of the real world or background.

The sound output module 153 outputs audio data which has been received from the wireless communication unit 110 in a call signal reception mode, a calling mode, a recording mode, a voice recognition mode, a broadcast reception mode, etc., or outputs audio data which has been stored in the memory 160. In addition, the sound output module 153 outputs an audio signal related to a function (e.g., a call signal reception sound, a message reception sound, etc.) performed by the mobile terminal 100. The sound output module 153 may include a speaker, a buzzer, and the like. The sound output module 153 may inform the user that it has gone into the first or second mode.

The camera 160 may include a first camera 160*a* and a second camera 160*b*.

The first camera 160*a* is located in proximity to at least one of the left and right eyes, and adapted to capture an image in front of it. Since the first camera 160*a* is positioned in proximity to an eye, the first camera 160*a* can acquire an image of the scene the user is looking at.

The second camera 160*b* is located in proximity to at least one of the left and right eyes, and adapted to capture an image of the user. According to an exemplary embodiment, the second camera 160*b* may acquire an image of the user's eye.

The camera 160 may acquire a plurality of images of the user's eye for a predetermined period of time. The period of time and the number of acquired images are set values. For example, in the first mode, the camera 160 may acquire fifty images of the user's eye for ten seconds. A plurality of images of the user's eye may be transmitted to an image processor 181, 281, or 381 and processed.

The camera 160 may include image sensor. The image sensor may be a CCD or CMOS. The camera 160 may further include an image processor. That is, the acquired images may be processed by the image processor and output.

The wearable device 100 may further include an infrared light source (not shown) to acquire an image of the user's eye. In this case, the camera 160 has an infrared transmitting filter mounted on it. The infrared light source emits infrared light to the user's eye. The camera 160 may output images of the user's eye representing only the frequency components of the emitted infrared light. By further including an infrared light source (not shown), the camera 160 may acquire high-resolution images of the user's eye representing only the frequency components of infrared rays.

The wearable device controller 180 controls the overall operation of the wearable device 100. The wearable device controller 180 processes signals, data, information, etc. input or output through each of the components. The wearable device controller 180 may provide proper information or functions to the user or process them by running an application program stored in the wearable device memory 140.

Moreover, the wearable device controller 180 may control at least some of the components. Further, the wearable device controller 180 may operate at least two of the components contained in the wearable device 100 in combination, in order to run the application program.

The wearable device controller 180 may be implemented using at least one of application specific integrated circuits (ASICs), digital signal processors (DSPs), digital signal processing devices (DSPDs), programmable logic devices (PLDs), field programmable gate arrays (FPGSs), processors, controllers, micro-controllers, microprocessors and electrical units for executing other functions.

The wearable device controller 180 may include an image processor 181. The image processor 181 will be described in detail with reference to FIG. 4.

The wearable device controller 180 may generate control signals based on data received from the image processor 181.

The lighting device 200 may include a communication unit 210, an input unit 220, a memory 240, an indication unit 250, a drive unit 260, a light emitting unit 270, a controller 280, and a power supply 290.

The communication unit 210 sends and receives data by communicating with the wearable device 100. The communication unit 210 connects with the controller 280, and sends and receives data to and from the wearable device 100 in response to a control signal. The communication unit 210 transmits the data received from the wearable device 100 to the controller 280.

The wireless communication unit 210 is able to communicate with the wearable device 100 over Bluetooth.

The wireless communication unit 210 may use communication protocols such as Wi-Fi Direct, RFID (Radio Frequency Identification), IrDA (Infrared Data Association), UWB (Ultra Wideband), ZigBee, and NFC (Near Field Communication), as well as Bluetooth.

The communication unit 210 may include an RF (Radio Frequency) circuit. The communication unit 210 may send and receive RF signals, i.e., electromagnetic signals. The RF circuit may convert an electrical signal into an electromagnetic signal or vice versa, and communicate with the wearable device 100 using the electromagnetic signal.

For example, the RF circuit may include an antenna system, an RF transceiver, one or more amplifiers, a tuner, one or more oscillators, a digital signal processor, a CODEC chipset, memory, etc. The RF circuit may include well-known circuitry for performing communication functions.

The communication unit 210 may receive information sensed by the sensing unit 130 by communicating with the wearable device 100 having the sensing unit 130. For example, the communication unit 210 may receive from the wearable device 100 information on the level of illumination in the surrounding environment sensed by the illumination sensor 131.

The communication unit 210 may receive from the wearable device 100 image data acquired by the camera 160. For example, the communication unit 210 may receive an image of the user's eye acquired by the camera 160.

The input unit 220 may receive the brightness of the light emitting unit 270 which is selected by the user. The input unit 220 may be embedded in the lighting device 200. Alternatively, the input unit 220 may be configured separately from the lighting device 200. Also, the input unit 220 may be connected to a remote controller (not shown) either by wires or wirelessly and receive user input. The input unit 220 may include a keypad, a dome switch, a touchpad (static pressure/capacitance), a jog wheel, a jog switch, and the like.

For example, if the input unit 220 is a jog wheel, the user may adjust the brightness of the lighting device 200 by turning the jog wheel. According to the user's selection, the input unit 220 may generate a brightness selection signal and output it to the controller 280. In this case, the user may choose to switch on or off the lighting device 200 which is not powered up, and accordingly decide to apply power to the lighting device 200.

For example, when the user chooses to increase the level of illumination of the lighting device 200, the input unit 220 generates an illumination-up signal. On the other hand, when the user chooses to decrease the level of illumination of the lighting device 200, the input unit 220 generates an illumination-down signal. That is, the input unit 220 may directly receive user input.

The memory 240 may store data and commands for operating the lighting device 200.

The memory 240 may store data received from the wearable device 100. For example, the memory 240 may store images of the user's eye received from the wearable device 100. Alternatively, the memory 240 may store pupil images received from the wearable device 100. Alternatively, the memory 240 may store control signals received from the wearable device 100.

The memory 240 may store preset PIN (Personal Identification Number) information of the wearable device 100 which is used for communications security.

The memory 240 may include non-volatile memory, such as one or more magnetic disk storage devices, flash memory devices, or other non-volatile solid state memory devices. The present invention is not limited to these examples, and the memory 240 may include a readable storage medium.

For example, the memory 240 may include EEP-ROM (Electronically Erasable and Programmable Read Only Memory). Information can be written to or erased from EEP-ROM by the controller 280 during the operation of the controller 280. EEP-ROM may be a memory device that keeps the information stored in it without erasing it even when power is lost.

The indication unit 250 externally indicates whether a communication connection is made between the lighting device 200 and the wearable device 100 or not. The indication unit 250 externally indicates whether a communication connection is currently made between the lighting device 200 and the wearable device 100 or not, in order to prevent an attempt for connection to other additional wearable devices 100 from making the control of the lighting device 200 complicated and disturbing the user settings for lighting.

The indication unit 250 may externally indicate whether the lighting device 200 goes into the first mode or the second mode.

The indication unit 250 may externally indicate through a speaker or bulb that the lighting device 200 establishes a communication connection with the wearable device 100 or goes into the first mode while connected to the wearable device 100 for communication.

The drive unit 260 receives a control signal from the controller 280. The drive unit 260 applies driving current to the light emitting unit 270 in response to the control signal. The illumination, dimming, color temperature, color, and flickering of light emitted from the light emitting unit 270 are controlled in accordance with the driving current applied from the drive unit 260.

The light emitting unit 270 includes a substrate and at least one light emitting element mounted on the substrate. The light emitting element emits light when powered, and its brightness may vary with the amount of power applied. Also, the color temperature of the light emitting element may vary with power, and the color of emitted light may vary from combinations of red (R), green (G), and blue (B). The light emitting unit 270 may include a plurality of LED elements. Specifically, the light emitting unit 270 includes white, red, green, and blue LED elements by reaction with fluorescent materials. The light emitting unit 270 is driven by receiving driving current from the drive unit 260.

The controller 280 receives data from the communication unit 210. The controller 280 controls the light emitting unit 270 based on the received data. That is, the controller 280 transmits a control signal to the drive unit 260 based on lighting control data to control the light emitting unit 270 and adjust lighting properties.

The controller 280 may include an image processor 281. The image processor 281 will be described in detail with reference to FIG. 4.

The controller 280 may generate control signals based on data received from the image processor 281.

The controller 280 may generate control signals based on data stored in the memory 240.

The controller 280 may be implemented using at least one of application specific integrated circuits (ASICs), digital signal processors (DSPs), digital signal processing devices (DSPDs), programmable logic devices (PLDs), field programmable gate arrays (FPGSs), processors, controllers, micro-controllers, microprocessors and electrical units for executing other functions.

The power supply unit 290 is connected to a power supply source and supplies electric power to the lighting device. The power supply unit 290 may include a converter that converts between AC and DC depending on the type of power used. The power supply unit 290 may further include a power conservation circuit or a voltage step-down regulator for supplying a certain level of static current.

If a plurality of wearable devices 100 are positioned in proximity to the lighting device 200, this may cause a problem with the communication connection between the lighting device 200 and the wearable devices 100. Also, when the lighting device 200 and the wearable device 100 are connected for communication, there may be a problem with an attempt to connect to other additional wearable devices 100.

In this case, the controller 280 may control the communication unit 210 to form a communication channel with the first wearable device 100a with the highest priority according to the order of connection requests made. That is, the communication unit 210 forms a communication channel with the first wearable device 100a which has made the earliest connection attempt, among the plurality of wearable devices 100 that have sent and received a connection signal to and from the lighting device 200. The communication channel is formed without entering a pin code, which simplifies the formation of a communication channel by the lighting device, requires less time, and offers convenience for use.

When a communication channel with the first wearable device 100a is established, the controller 280 may control the communication unit 210 not to respond to a connection signal from other wearable devices 100b. Accordingly, this prevents a connection between the lighting device 200 and the plurality of wearable devices 100a and 100b from making the control of the light emitting unit 270 complicated and prevents other people from changing the user settings.

In the present invention, the communication unit 210 also may form a plurality of communication channels with other wearable devices 100b simultaneously in response to a connection signal after forming a communication channel with the first wearable device 100a.

When the communication unit 210 receives a connection signal from a plurality of wearable devices, the controller 280 may receive pin codes from the plurality of wearable devices 100, compares them with the PIN (Personal Identification Number) codes stored in the memory 240, and control the communication unit 210 to form a communication channel with the first wearable device 100a which is given the highest priority, among the wearable devices 100 having a matching PIN code. In this case, the PIN codes of the communication unit 210 and the priorities of connection of the wearable devices 100 may be stored in the memory 240.

Specifically, the controller 280 controls the communication unit 210 to transmit a PIN code request signal to the plurality of wearable devices 100 that have sent a connection signal. Afterwards, the controller 280 compares the pin codes transmitted from the plurality of the wearable devices 100 with the PIN codes stored in the memory 240 and determines the priorities of the wearable devices 100 having a matching PIN code.

Accordingly, the lighting device 200 forms a communication channel with the first wearable device 100a with the highest priority. The communication unit 210 does not respond to any wearable device having no matching PIN code.

This type of communication channel formation requires a PIN code when forming a communication channel, and therefore has the advantage of preventing the light emitting unit from being controlled by other wearable devices connected without permission.

Figure 4:
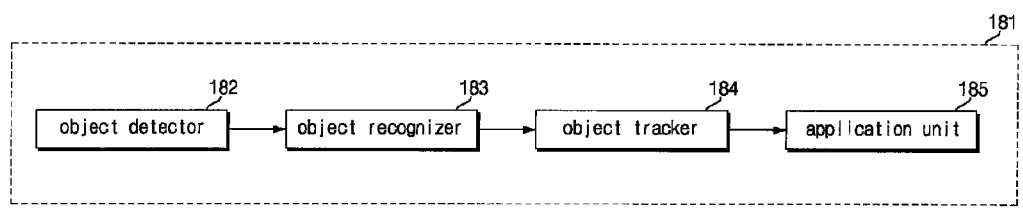
FIG. 4 is a block diagram showing the components of an image processor according to the exemplary embodiment of the present invention.
Figure 4:
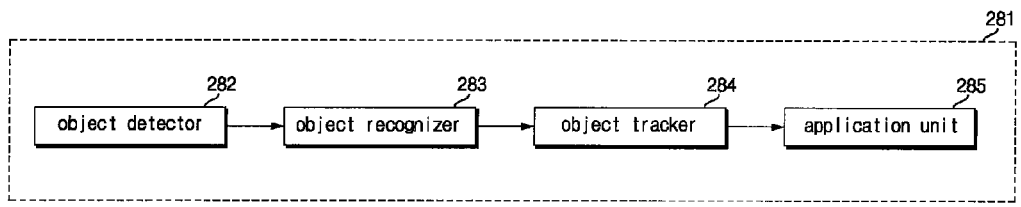

FIG. 4 is a block diagram showing the components of an image processor according to the exemplary embodiment of the present invention.

(a) of FIG. 4 illustrates that the image processor 181 is included in the wearable device controller 180. (b) of FIG. 4 illustrates that the image processor 281 is included in the controller 280 of the lighting device 200.

The image processor 181 included in the wearable device 100 processes images based on at least one image of the user's eye acquired from the camera 160.

The image processor 281 included in the lighting device 200 processes images based on at least one image of the user's eye received from the communication unit 210.

The image processor 181 or 281 includes an object detector 182 or 282, an object recognizer 183 or 283, an object tracker 184 or 284, and an application unit 185 or 285.

The object detector 182 or 282 detects a pupil image from an image of the user's eye. For example, the object detector 182 or 282 can detect a pupil image using a circular detection template, a circular edge detection technique, Daugman's circular edge detection technique, etc. because the pupil is nearly round. The object detector 182 or 282 may detect a pupil image using Hough transform, Haar-like feature, AdaBoost algorithm, etc.

The object detector 182 or 282 may detect a plurality of pupil images from a plurality of images of the user's eye, respectively. The plurality of images of the user's eye is a preset number of images that are acquired for a preset period of time.

The pupil is the circle in the center of the eye, which is surrounded by the iris. The pupil is darker than the rest of the eye and normally black. Light enters the eye through the cornea and then through the pupil. Hence, the size of the pupil determines the amount of light entering the eye. That is, when the pupil contracts or expands to control the amount of light entering the eye, it changes the size of the pupil. The pupil size is controlled not by changes in shape caused by the sphincter papillae, but by the iris sphincter muscle around the pupil. When a relatively large amount of light is directed to a human eye, the pupil constricts. Constriction of the pupil reduces the amount of light entering the eye. When a relatively small amount of light is directed to the human eye, the pupil dilates and this increases the amount of light entering the eye.

The object recognizer 183 or 283 compares the size of a detected pupil image with preset first and second reference values. The first and second reference values may be stored in the wearable memory device memory 140 or the memory 240.

The first and second reference values are reference pupil sizes that are set according to test values or accumulated pupil images. For example, if the pupil size is greater than or equal to the first reference value, it can be assumed that the amount of light directed to the human eye is small. In another example, if the pupil size is less than or equal to the second reference value, it can be assumed that the amount of light directed to the human eye is large. By comparing a pupil image of the user with the first and second reference values, it can be found out whether the right amount of light is directed to the user's eye or not.

The object recognizer 183 or 283 may calculate the average size of a plurality of pupil images received from the object detector 182 or 282. The object recognizer 183 or 283 may compare the average size of the plurality of pupil images with the preset first and second reference values. The plurality of pupil images are detected from a preset number of images of the user's eye that are captured for a preset period of time.

The object recognizer 183 or 283 compares the position of a detected pupil image with a preset third reference value. The third reference value may be stored in the wearable device memory 140 or the memory 240.

The third reference value is the reference position of the pupil which is set based on test values or pupil images. For example, the third reference value may be the position of the pupil when the user looks straight ahead.

The object recognizer 183 or 283 may calculate the average position of a plurality of pupil images upon receiving them from the object detector 182 or 282. The object recognizer 183 or 283 may compare the average position of the plurality of pupil images with the third reference value. The plurality of pupil images is detected from a preset number of images of the user's eye that are captured for a preset period of time.

The object tracker 184 or 284 calculates a change in the position of a pupil image based on the result of comparison of the position of the pupil image and the third reference value. For example, the object tracker 184 or 284 calculates whether a pupil image is located above or below the third reference value.

The application unit 185 or 285 calculates the level of illumination corresponding to the result of comparison by the object recognizer 183 or 283. For example, if the size of a pupil image is greater than or equal to the first reference value, the application unit 185 or 285 increases the level of illumination from the lighting device 200. On the other hand, if the size of the pupil image is less than or equal to the second reference value, the application unit 185 or 285 decreases the level of illumination from the lighting device 200.

If the lighting system includes a plurality of lighting devices 200, the application unit 185 or 285 calculates the number of lighting devices to be activated, corresponding to the result of comparison by the object recognizer 183 or 283. For example, if the size of a pupil image is greater than or equal to the first reference value, the application unit 185 or 285 increases the number of lighting devices to be activated. On the other hand, if the size of the pupil image is less than or equal to the second reference value, the application unit 185 or 285 decreases the number of lighting devices to be activated.

The application unit 185 or 285 calculates the level of illumination corresponding to the position change calculated by the object tracker 184 or 284. For example, if a pupil image is located above the third reference value, the application unit 185 or 285 increases the level of illumination from the lighting device 200. On the other hand, if the pupil image is located below the third reference value, the application unit 185 or 285 decreases the level of illumination from the lighting device 200.

If the lighting system includes a plurality of lighting devices 200, the application unit 185 or 285 calculates the number of lighting devices to be activated corresponding to the position change calculated by the object tracker 184 or 284. For example, if a pupil image is located above the third reference value, the application unit 185 or 285 increases the number of lighting devices to be activated. On the other hand, if the pupil image is located below the third reference value, the application unit 185 or 285 decreases the number of lighting devices to be activated.

As described above, the lighting system according to the exemplary embodiment of the present invention can calculate the level of illumination from a lighting device or the number of lighting devices to be activated among a plurality of lighting devices, based on a pupil image of the user. Accordingly, the lighting system according to the exemplary embodiment of the present invention can provide the right level of illumination suitable for the user by controlling lighting according to pupil size. Moreover, the lighting system according to the exemplary embodiment of the present invention offers convenient lighting control for the user.

The image processor 181 and 281 may further include an image preprocessor (not shown). The image preprocessor (not shown) may perform preprocessing for changing an acquired image of the eyes of the user into an image suitable for pupil detection. The image preprocessor (not shown) can perform noise reduction, rectification, calibration, color enhancement, color space conversion (CSC), interpolation, camera gain control, etc.

Figure 5:
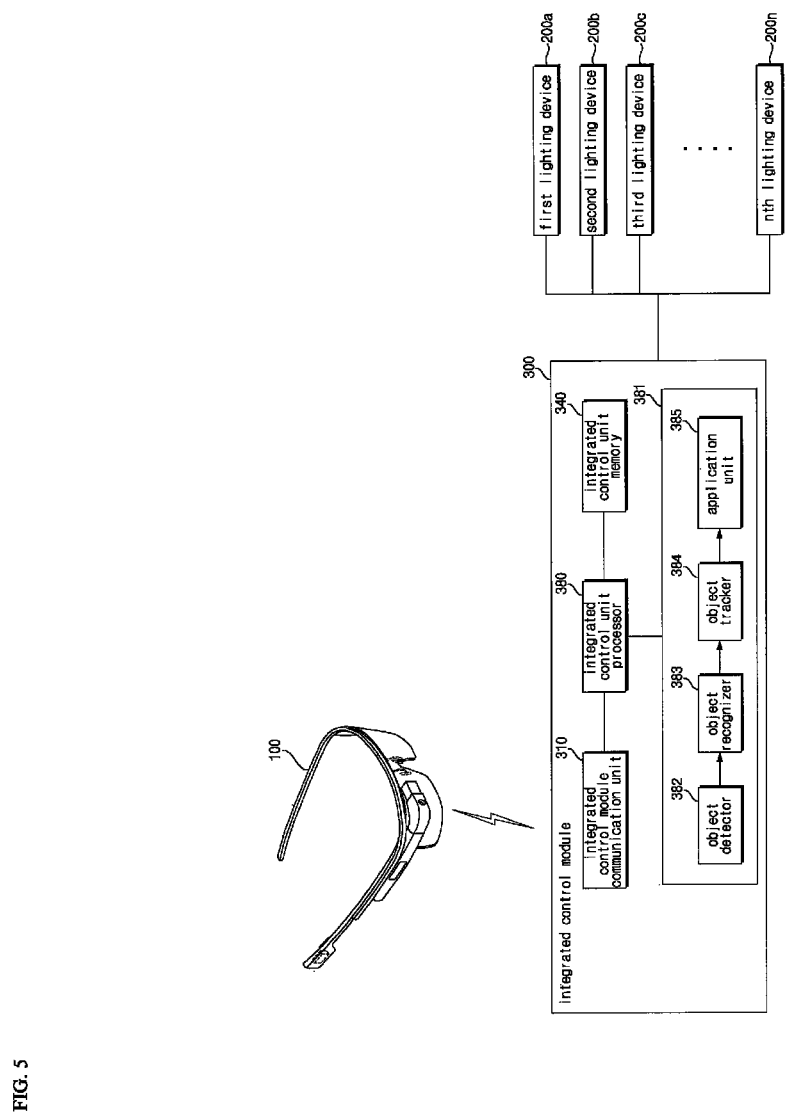
FIG. 5 is a block diagram showing the components of the lighting system according to the exemplary embodiment of the present invention.

FIG. 5 is a block diagram showing the components of the lighting system according to the exemplary embodiment of the present invention.

Referring to FIG. 5, the lighting system according to the exemplary embodiment of the present invention includes a wearable device 100, an integrated control module 300, and a plurality of lighting devices 200 (200*a* to 200*n*).

Descriptions of the wearable device 100 and the lighting devices 200 (200*a* to 200*n*) will be omitted if they are redundant to those made with reference to FIGS. 2 to 4.

The wearable device 100 has at least one camera 160. The wearable device 100 communicates with the integrated control module 300. The wearable device 100 transmits at least one image captured by the camera 160 to the integrated control module 300. Alternatively, the wearable device 100 may transmit a control signal for controlling the lighting devices 200 (200*a* to 200*n*) to the integrated control module 300 according to an exemplary embodiment.

The integrated control module 300 communicates with the wearable device 10. The integrated control module 300 receives an image of the user's eye from the wearable device 100. The integrated control module 300 detects a pupil image based on the image of the user's eye. The integrated control module 300 controls the number of lighting devices to be activated among the plurality of lighting devices 200 (200*a* to 200*n*), based on the detected pupil image.

Hereinafter, the operations of the components included in the integrated control module 300 will be described.

The integrated control module 300 includes an integrated control module communication unit 310, an integrated control module memory 340, an integrated control module processor 380, and an image processor 381.

The integrated control module communication unit 310 communicates with the wearable device 100 or the plurality of lighting devices 200 (200*a* to 200*n*).

The integrated control module 310 sends and receives data or signals to or from the wearable device 100 and the plurality of lighting devices 200 (200*a* to 200*n*).

The integrated control module communication unit 310 is able to communicate with the wearable device 100 over Bluetooth.

The integrated control module communication unit 310 may use communication protocols such as Wi-Fi Direct, RFID (Radio Frequency Identification), IrDA (Infrared Data Association), UWB (Ultra Wideband), ZigBee, and NFC (Near Field Communication), as well as Bluetooth.

The integrated control module communication unit 310 may include an RF (Radio Frequency) circuit. The integrated control module communication unit 310 may send and receive RF signals, i.e., electromagnetic signals. The RF circuit may convert an electrical signal into an electromagnetic signal or vice versa, and communicate with the wearable device 100 using the electromagnetic signal.

For example, the RF circuit may include an antenna system, an RF transceiver, one or more amplifiers, a tuner, one or more oscillators, a digital signal processor, a CODEC chipset, memory, etc. The RF circuit may include well-known circuitry for performing communication functions.

The integrated control module communication unit 310 may receive information sensed by the sensing unit 130 by communicating with the wearable device 100 having the sensing unit 130. For example, the integrated control module communication unit 310 may receive from the wearable device 100 information on the level of illumination in the surrounding environment sensed by the illumination sensor 131.

The integrated control module communication unit 310 may receive from the wearable device 100 image data acquired by the camera 160. For example, the integrated control module communication unit 310 may receive an image of the user's eye acquired by the camera 160.

The image processor 381 processes images based on the image of the user's eye received from the integrated control communication unit 310.

The integrated control module memory 340 may store data and commands for operating the plurality of lighting devices 200 (200*a* to 200*n*).

The integrated control module memory 340 may store data received from the wearable device 100. For example, the integrated control module memory 340 may store images of the user's eye received from the wearable device 100. Alternatively, the integrated control module memory 340 may store pupil images received from the wearable device 100. Alternatively, the integrated control module memory 340 may store control signals received from the wearable device 100.

The integrated control module memory 340 may store preset PIN (Personal Identification Number) information of the wearable device 100 which is used for communications security.

The integrated control module memory 340 may include non-volatile memory, such as one or more magnetic disk storage devices, flash memory devices, or other non-volatile solid state memory devices. The present invention is not limited to these examples, and the integrated control module memory 340 may include a readable storage medium.

For example, the integrated control module memory 340 may include EEP-ROM (Electronically Erasable and Programmable Read Only Memory). Information can be written to or erased from EEP-ROM by the integrated control module processor 380 during the operation of the integrated control module processor 380. EEP-ROM may be a memory device that keeps the information stored in it without erasing it even when power is lost.

The integrated control module processor 380 receives data from the integrated control module communication unit 310. The integrated control module processor 380 controls the plurality of lighting devices 200 (200*a* to 200*n*) based on the received data. That is, the integrated control module processor 380 adjusts the number of lights when activated by transmitting a control signal to the plurality of lighting devices 200 (200*a* to 200*n*).

The integrated control module processor 380 may generate control signals based on data received from the image processor 381.

The integrated control module processor 380 may generate control signals based on data stored in the integrated control module memory 340.

If a plurality of wearable devices 100 are positioned in proximity to the integrated control module 300, this may cause a problem with the communication connection between the integrated control module 300 and the plurality of wearable devices 100.

In this case, the integrated control module 380 only communicates with any wearable devices 100 that are authenticated based on the PIN information of the wearable devices 100 stored in the integrated control module memory 340. If there are a plurality of authenticated wearable devices 100, the integrated control module 300 forms a communication channel with the first wearable device 100*a* with the highest priority.

The image processor 381 detects a pupil image based on a received image of the user's eye. The image processor 381 may compare the pupil image with preset first and second reference values and calculate the number of lighting devices to be activated corresponding to the size of the detected pupil image.

The image processor 381 may compare the detected pupil image with a third reference value and calculate the number of lighting devices to be activated corresponding to the position of the detected pupil image.

The image processor 381 includes an object detector 382, an object recognizer 383, an object tracker 384, and an application unit 385.

The object detector 382 detects a pupil image from an image of the user's eye. For example, the object detector 382 can detect a pupil image using a circular detection template, a circular edge detection technique, Daugman's circular edge detection technique, etc. because the pupil is nearly round. The object detector 182 or 282 may detect a pupil image using Hough transform, Haar-like feature, AdaBoost algorithm, etc.

The object detector 382 may detect a plurality of pupil images from a plurality of images of the user's eye, respectively. The plurality of images of the user's eye is a preset number of images that are acquired for a preset period of time.

The object recognizer 383 compares the size of a detected pupil image with preset first and second reference values. The first and second reference values may be stored in the integrated control module memory 340.

The first and second reference values are reference pupil sizes that are set according to test values or accumulated pupil images. For example, if the pupil size is greater than or equal to the first reference value, it can be assumed that the amount of light directed to the human eye is small. In another example, if the pupil size is less than or equal to the second reference value, it can be assumed that the amount of light directed to the human eye is large.

The object recognizer 383 may calculate the average size of a plurality of pupil images received from the object detector 382. The object recognizer 383 may compare the average size of the plurality of pupil images with the preset first and second reference values. The plurality of pupil images are detected from a preset number of images of the user's eye that are captured for a preset period of time.

The object recognizer 383 compares the position of a detected pupil image with a preset third reference value. The third reference value may be stored in the integrated control module memory 340. The third reference value is the reference position of the pupil which is set based on test values or pupil images. For example, the third reference value may be the position of the pupil when the user looks straight ahead.

The object recognizer 383 may calculate the average position of a plurality of pupil images upon receiving them from the object detector 382. The object recognizer 383 may compare the average position of the plurality of pupil images with the third reference value. The plurality of pupil images are images is detected from the images of the user's eye that are captured a preset number of times for a preset period of time.

The object tracker 384 calculates a change in the position of a pupil image based on the result of comparison of the position of the pupil image and the third reference value. For example, the object tracker 384 calculates whether a pupil image is located above or below the third reference value.

The application unit 385 calculates the number of lighting devices to be activated c to the result of comparison by the object recognizer 383. For example, if the size of a pupil image is greater than or equal to the first reference value, the application unit 385 increases the number of lighting devices to be activated. On the other hand, if the size of the pupil image is less than or equal to the second reference value, the application unit 385 decreases the number of lighting devices to be activated.

The application unit 385 calculates the number of lighting devices to be activated corresponding to the position change calculated by the object tracker 384. For example, if a pupil image is located above the third reference value, the application unit 385 increases the number of lighting devices to be activated. On the other hand, if the pupil image is located below the third reference value, the application unit 385 decreases the number of lighting devices to be activated.

The image processor 381 may further include an image preprocessor (not shown). The image preprocessor (not shown) may perform preprocessing for changing an acquired image of the eyes of the user into an image suitable for pupil detection. The image preprocessor (not shown) can perform noise reduction, rectification, calibration, color enhancement, color space conversion (CSC), interpolation, camera gain control, etc.

Each of the plurality of lighting devices 200 (200*a* to 200*n*) includes one or more light emitting elements. The plurality of lighting devices 200 (200*a* to 200*n*) receive control signals from the integrated control module. The activation of the plurality of lighting devices 200 (200*a* to 200*n*) and the illumination, dimming, color temperature, color, and flickering of light are controlled in response to the control signals.

Figure 6A:
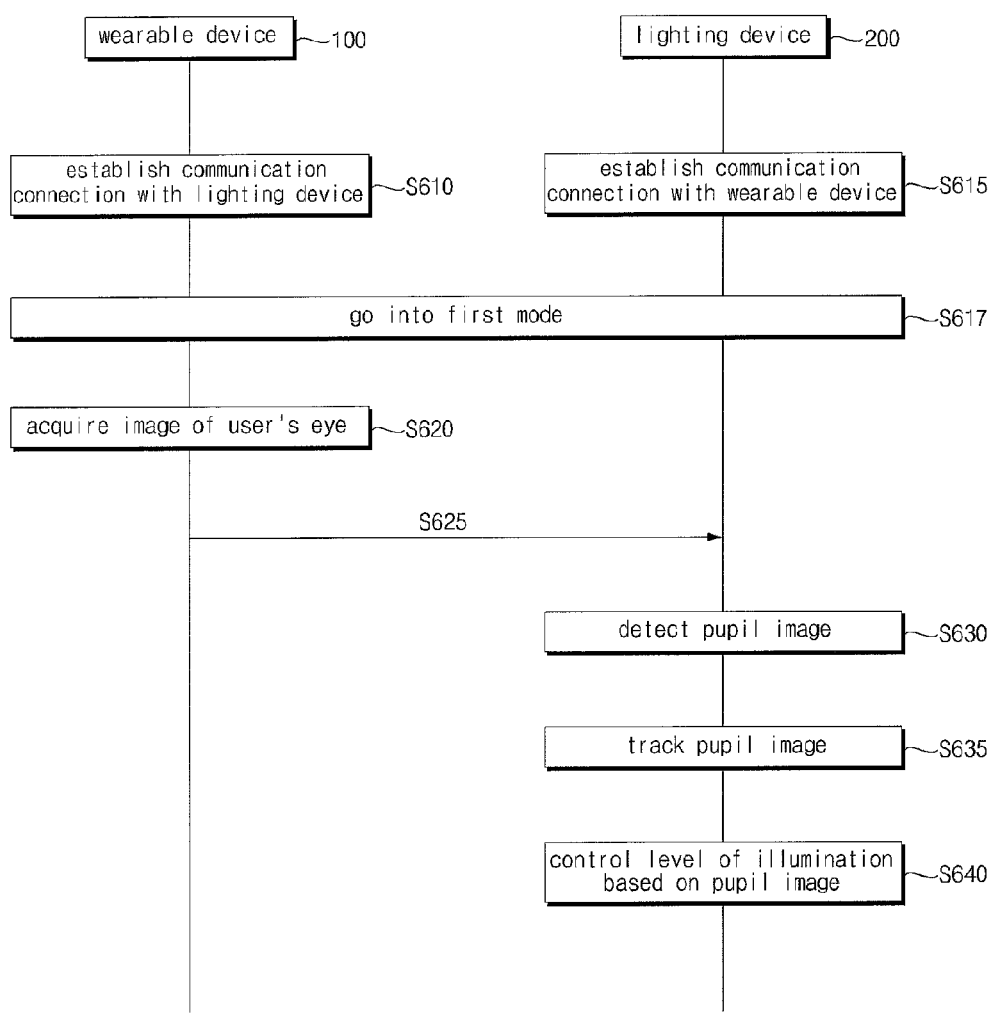
FIGS. 6a and 6b are signal-flow charts of a lighting system according to a first or second exemplary embodiment of the present invention.
Figure 6B:
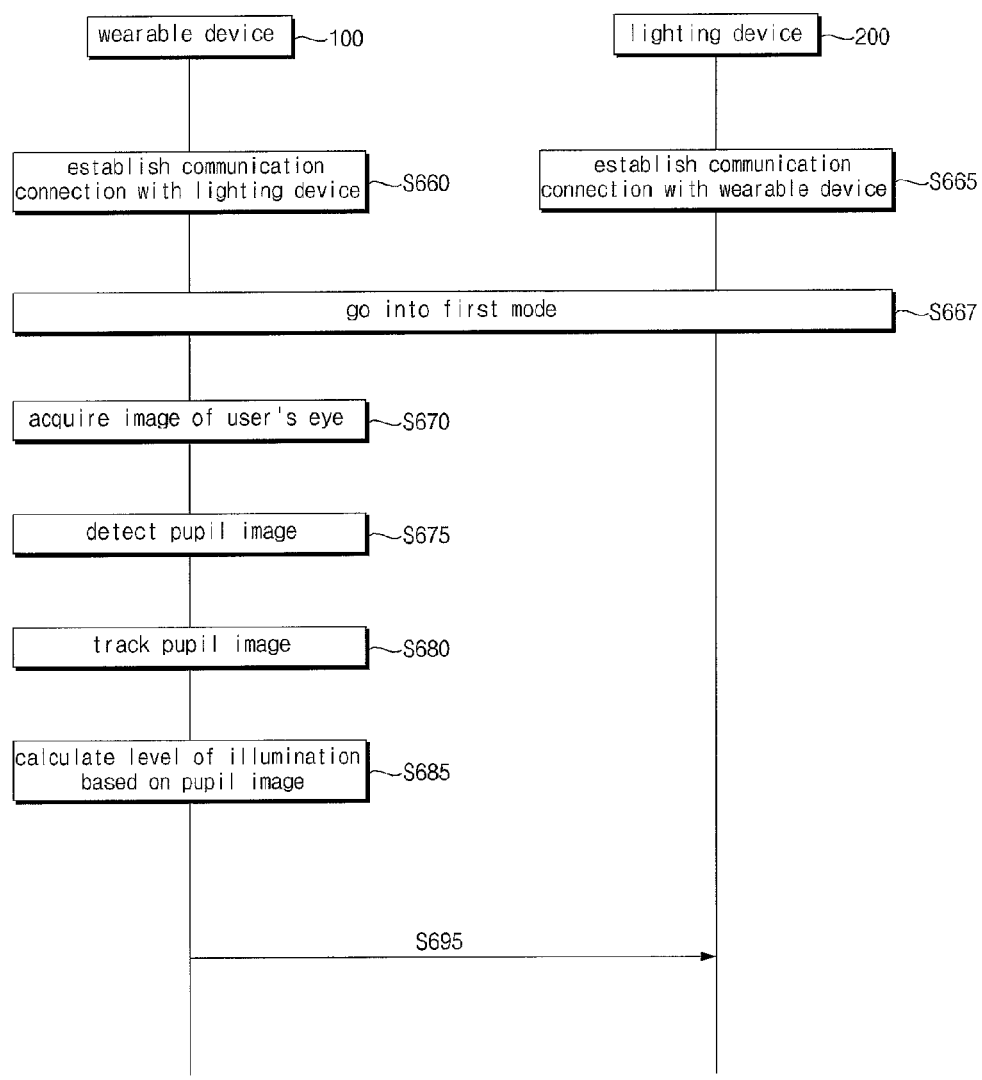

FIGS. 6*a* and 6*b* are signal-flow charts of a lighting system according to a first or second exemplary embodiment of the present invention.

FIG. 6*a* illustrates that the lighting device 200 includes the image processor 281. FIG. 6*b* illustrates that the wearable device 100 includes the image processor 181.

Referring to FIG. 6*a*, the wearable device 100 forms a communication channel with the lighting device 200. That is, the wearable device 100 establishes a communication connection with the lighting device 200 (S610 and S615).

While connected to the lighting device 200 for communication, the wearable device 100 goes into the first mode (S617). Alternatively, the lighting device 200 goes into the first mode. The first mode may be a mode for controlling lighting based on an image of the user's eye (e.g., pupil image) while the wearable device 100 and the lighting device 200 are connected for communication. In this case, the wearable device controller 180 may receive user input through the wearable device input unit 120 to go into the first mode. Alternatively, the controller 280 may receive user input through the input unit 220 to go into the first mode.

While in the first mode, the wearable device 100 acquires at least one image of the user's eye through the camera 160 (S620). The camera 160 may acquire a plurality of images of the user's eye for a predetermined period of time. The period of time and the number of acquired images are set values.

Once at least one image of the user's eye is acquired, the wearable device 100 transmits the at least one image of the user's eye to the lighting device 200 through the wireless communication unit 110 (S625). The lighting device 200 receives at least one image of the user's eye from the wearable device 100 through the communication unit 210.

Once at least one image of the user's eye is received, the lighting device 200 detects a pupil image from the at least one image of the user's eye (S630).

Once a pupil image is detected, the lighting device 200 tracks the pupil image (S635).

Afterwards, the lighting device 200 controls the level of illumination from the lighting device 200 based on the pupil image (S640).

Referring to FIG. 6*b*, the wearable device 100 forms a communication channel with the lighting device 200. That is, the wearable device 100 establishes a communication connection with the lighting device 200 (S660 and S665).

While connected to the lighting device 200 for communication, the wearable device 100 goes into the first mode (S667). Alternatively, the lighting device 200 goes into the first mode.

While in the first mode, the wearable device 100 acquires at least one image of the user's eye by the camera 160 (S670). The camera 160 may acquire a plurality of images for a predetermined period of time.

Once at least one image of the user's eye is acquired, the wearable device 100 detects a pupil image from the at least one image of the user's eye (S675).

Once a pupil is detected, the wearable device 100 tracks the pupil image (S680).

Afterwards, the wearable device 100 calculates the level of illumination from the lighting device 200 (S685).

Once the level of illumination is calculated, the wearable device 100 transmits a signal for controlling the level of illumination from the lighting device 200 (S695).

Figure 7A:
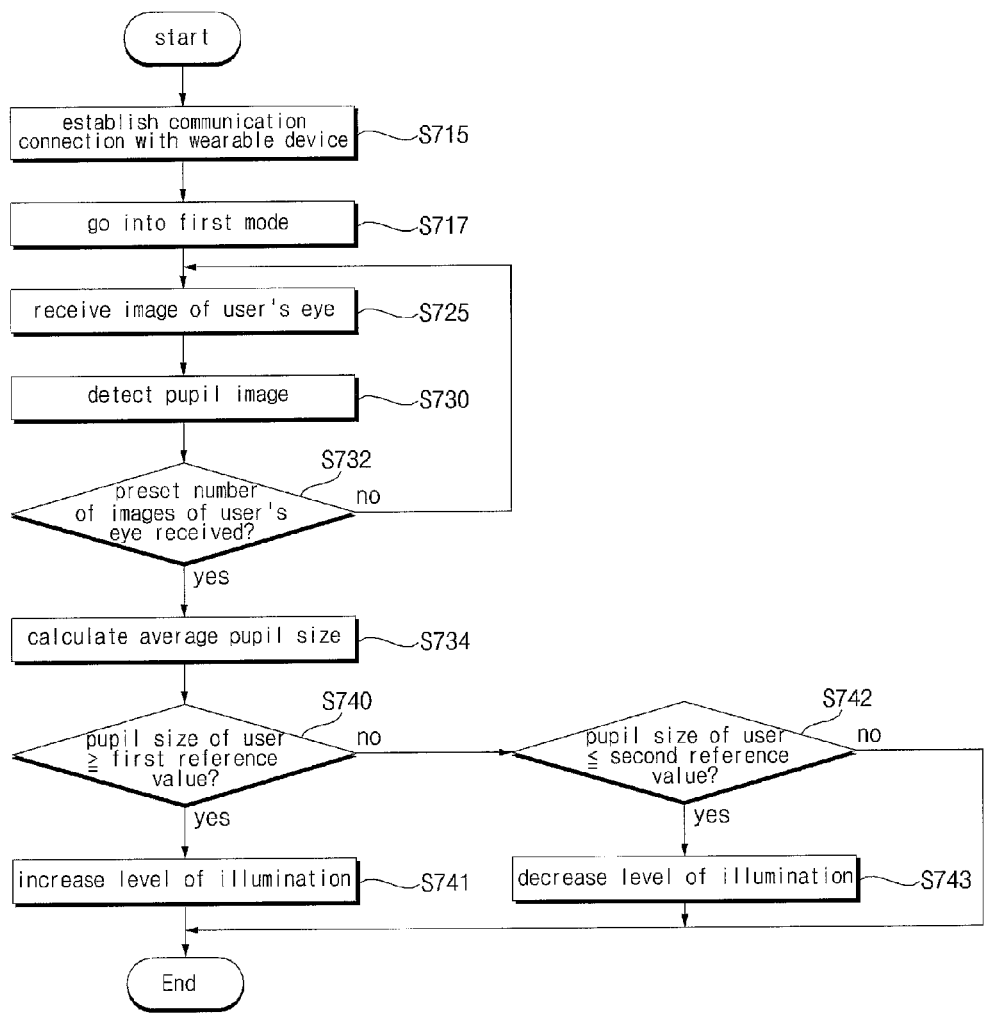
FIGS. 7a and 7b are flowcharts illustrating the operation of the lighting system according to the first exemplary embodiment of the present invention.
Figure 7B:
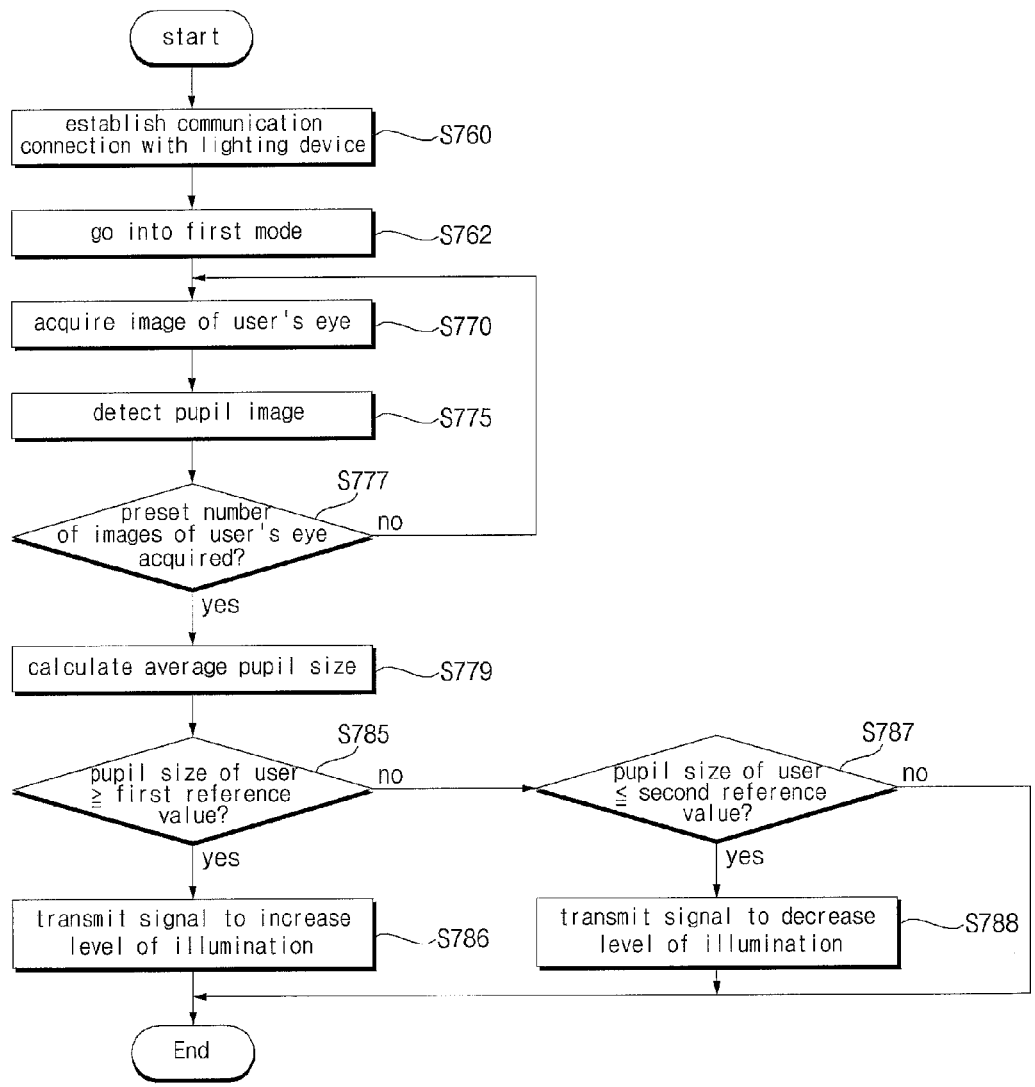

FIGS. 7*a* and 7*b* are flowcharts illustrating the operation of the lighting system according to the first exemplary embodiment of the present invention.

FIG. 7*a* is a flowchart referenced for describing the operation of the lighting device 200 according to the first exemplary embodiment of the present invention.

Referring to FIG. 7*a*, the controller 280 establishes a communication connection with the wearable device 100 via the communication unit 210 (S715).

While connected to the wearable device 100 for communication, the controller 280 goes into the first mode (S717). The first mode may be a mode for controlling lighting based on an image of the user's eye (e.g., pupil image) while the wearable device 100 and the lighting device 200 are connected for communication. The controller 280 may receive user input through the input unit 220 to go into the first mode.

While in the first mode, the controller 280 receives at least one image of the user's eye from the wearable device 100 (S725). The at least one mage of the user's eye may be an image that is acquired by the camera 160 included in the wearable device 100. The camera 160 may acquire a plurality of images of the scene in front of the user for a predetermined period of time. The period of time and the number of acquired images are set values.

Once an image of the user's eye is received, the controller 280 detects a pupil image from the image of the user's eye (S730). Specifically, the operation of detecting a pupil image may be performed by the object detector 282 included in the image processor 281, as explained with reference to FIG. 4.

After a pupil image is detected, the controller 280 determines whether a preset number of images of the user's eye are received or not (S732). The preset number may be a value required to calculate the average pupil size. The preset number may be a set value.

If the preset number of images of the user's eye are received, the controller 280 calculates the average pupil size from at least one pupil image (S734). Specifically, the operation of calculating the average pupil size may be performed by the object recognizer 283 included in the image processor 281, as explained with reference to FIG. 4.

If the preset number of images of the user's eye are not received, the controller 280 receives images of the user's eye (S725).

Once the average pupil size is calculated, the controller 280 determines whether or not the pupil size of the user is greater than or equal to a first reference value (S740). The first reference value may be stored in the memory 240. The first reference value is a reference pupil size that is set according to test values or accumulated pupil images. For example, if the pupil size is greater than or equal to the first reference value, it can be assumed that the amount of light directed to the human eye is small. Specifically, the determination of pupil size may be performed by the object recognizer 283 included in the image processor 281, as explained with reference to FIG. 4.

If the pupil size of the user is greater than or equal to the first reference value, the controller 280 transmits a control signal to the drive unit 260 to increase the level of illumination from the light emitting unit 270 (S741).

In step S740, if the pupil size of the user is not greater than or equal to the first reference value, the controller 280 determines whether the average pupil size of the user is less than or equal to a second reference value (S742). The second reference value may be stored in the memory 240. The second reference value is a reference pupil size that is set according to test values or accumulated pupil images. For example, if the pupil size is less than or equal to the second reference value, it can be assumed that the amount of light directed to the human eye is large. Specifically, the determination of pupil size may be performed by the object recognizer 283 included in the image processor 281, as explained with reference to FIG. 4.

If the pupil size of the user is less than or equal to the second reference value, the controller 280 transmits a control signal to the drive unit 260 to decrease the level of illumination from the light emitting unit 270 (S743).

The operation of calculating the level of illumination corresponding to pupil size may be performed by the application unit 285 included in the image processor 281, as explained with reference to FIG. 4. The controller 280 generates a control signal based on the result of calculation by the application unit 285.

FIG. 7b is a flowchart referenced for describing the operation of the wearable device 100 according to the first exemplary embodiment of the present invention.

Referring to FIG. 7b, the wearable device controller 180 establishes a communication connection with the lighting device 200 via the wireless communication unit 110 (S760).

While connected to the lighting device 200 for communication, the wearable device controller 180 goes into the first mode (S762). The first mode may be a mode for controlling lighting based on an image of the user's eye (e.g., pupil image) while the wearable device 100 and the lighting device 200 are connected for communication. The wearable device controller 180 may receive user input through the wearable device input unit 120 to go into the first mode.

While in the first mode, the wearable device controller 180 acquires at least one image of the user's eye from the wearable device 100 (S770). The at least one image of the user's eye may be an image that is acquired by the camera 160 included in the wearable device 100. The camera 160 may acquire a plurality of images for a predetermined period of time. The period of time and the number of acquired images are set values.

Once an image of the user's eye is acquired, the wearable device controller 180 detects a pupil image from the image of the user's eye (S775). Specifically, the operation of detecting a pupil image may be performed by the object detector 182 included in the image processor 181, as explained with reference to FIG. 4.

After a pupil image is detected, the wearable device controller 180 determines whether a preset number of images of the user are acquired or not (S777). The preset number may be a value required to calculate the average pupil size. The preset number may be a set value.

If the preset number of images of the user's eye are acquired, the wearable device controller 180 calculates the average pupil size from at least one pupil image (S779). Specifically, the operation of calculating the average pupil size may be performed by the object recognizer 183 included in the image processor 181, as explained with reference to FIG. 4.

If the preset number of images of the user's eye are not acquired, the wearable device controller 180 receives images of the user's eye (S770).

Once the average pupil size is calculated, the wearable device controller 180 determines whether or not the pupil size of the user is greater than or equal to a first reference value (S785). The first reference value may be stored in the wearable device memory 140. The first reference value is a reference pupil size that is set according to test values or accumulated pupil images. For example, if the pupil size is greater than or equal to the first reference value, it can be assumed that the amount of light directed to the human eye is small. Specifically, the determination of pupil size may be performed by the object recognizer 183 included in the image processor 181, as explained with reference to FIG. 4.

If the pupil size of the user is greater than or equal to the first reference value, the wearable device controller 180 transmits a signal to the lighting device 200 to increase the level of illumination (S786).

In step S785, if the pupil size of the user is not greater than or equal to the first reference value, the wearable device controller 180 determines whether the average pupil size of the user is less than or equal to a second reference value (S787). The second reference value may be stored in the wearable device memory 140. The second reference value is a reference pupil size that is set according to test values or accumulated pupil images. For example, if the pupil size is less than or equal to the second reference value, it can be assumed that the amount of light directed to the human eye is large. Specifically, the determination of pupil size may be performed by the object recognizer 183 included in the image processor 181, as explained with reference to FIG. 4.

If the pupil size of the user is less than or equal to the second reference value, the wearable device controller 180 transmits a signal to the lighting device 200 to increase the level of illumination (S788).

The operation of calculating the level of illumination corresponding to pupil size may be performed by the application unit 185 included in the image processor 181, as explained with reference to FIG. 4. The wearable device controller 180 generates a control signal based on the result of calculation by the application unit 185 and transmits it to the lighting device 200.

Figure 8:
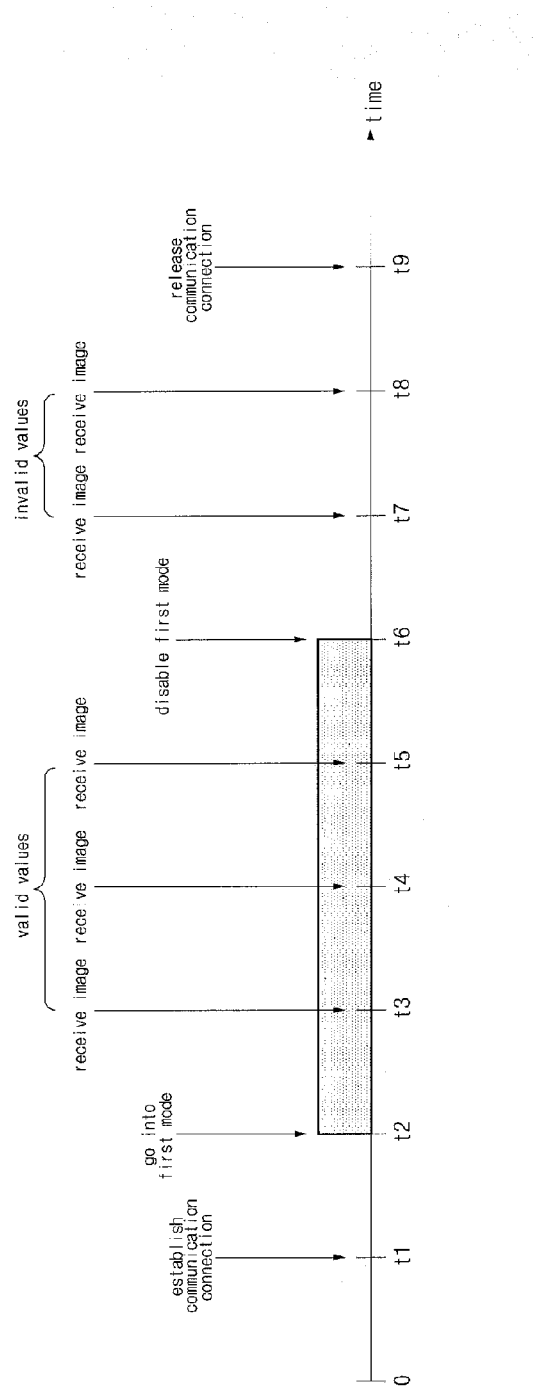
FIG. 8 is a view referenced to describe the operation of receiving an image in the first mode according to an exemplary embodiment of the present invention.

FIG. 8 is a view referenced to describe the operation of receiving an image in the first mode according to an exemplary embodiment of the present invention.

FIG. 8 illustrates the operation of the lighting system in the first mode. The operation of the lighting system in the second mode may be identical to the operation of the lighting system in the first mode.

Referring to FIG. 8, a communication connection is established between the wearable device 100 and the lighting device 200 at t1.

The wearable device 100 and the lighting device 200 go into the first mode at t2. The first mode may be a mode for controlling lighting based on an image of the user's eye (e.g., pupil image) while the wearable device 100 and the lighting device 200 are connected for communication. They may go into the first mode upon receiving user input through the wearable device input 120 or the input unit 220.

The wearable device 100 acquires images of the user's eye at t3, t4, and t5. The lighting device 200 receives images of the user's eye from the wearable device 100. The images acquired or received at t3, t4, and t5 are deemed as valid images. That is, if the wearable device 100 and the lighting device 200 are in the first mode, the acquired or received images are deemed as valid images.

The first mode is disabled at t6. The first mode may be disabled upon receiving user input through the wearable device input unit 120 or the input unit 220.

The wearable device 100 may acquire images of the user's eye at t7 and t8. The lighting device 200 may receive images of the user's eye from the wearable device 100. The images acquired or received at t7 and t8 are deemed as invalid images. That is, if the wearable device 100 and the lighting device 200 are not in the first mode, the acquired or received images are deemed as invalid images.

The communication connection between the wearable device 100 and the lighting device 200 is released at t9.

Figure 9:
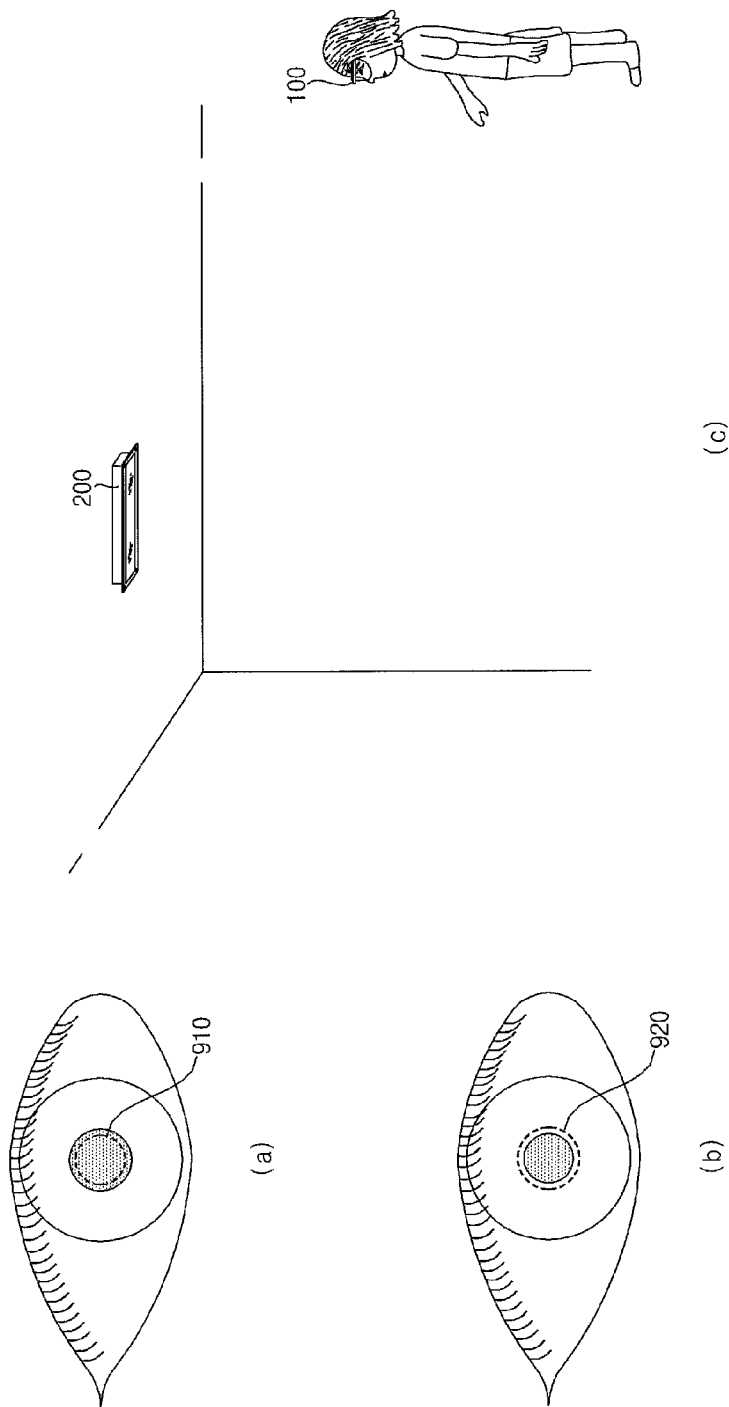
FIG. 9 is an illustration of the operation of the lighting system according to the first exemplary embodiment of the present invention.

FIG. 9 is an illustration of the operation of the lighting system according to the first exemplary embodiment of the present invention.

Referring to FIG. 9, the controller 280 establishes a communication connection with the wearable device 100 via the communication unit 210. While connected to the wearable device 100 for communication, the controller 280 goes into the first mode. While in the first mode, the controller 280 receives at least one image of the user's eye from the wearable device 100. Once an image of the user's eye is received, the controller 280 detects a pupil image from the image of the user's eye. If a preset number of images of the user's eye are received, the controller 280 calculates the average pupil size from at least one pupil image.

The controller 280 determines whether the pupil size of the user is greater than or equal to a first reference value 910.

If the pupil size of the user is greater than or equal to the first reference value as shown in (a) of FIG. 9, the controller 280 transmits a control signal to the drive unit 260 to increase the level of illumination from the light emitting unit 270 as shown in (c) of FIG. 9.

If the pupil size of the user is not greater than or equal to the first reference value, the controller 280 determines whether the average pupil size of the user is less than or equal to a second reference value 920.

If the pupil size of the user is less than or equal to the second reference value as shown in (b) of FIG. 9, the controller 280 transmits a control signal to the drive unit 260 to decrease the level of illumination from the light emitting unit 270 as shown in (c) of FIG. 9.

Figure 10A:
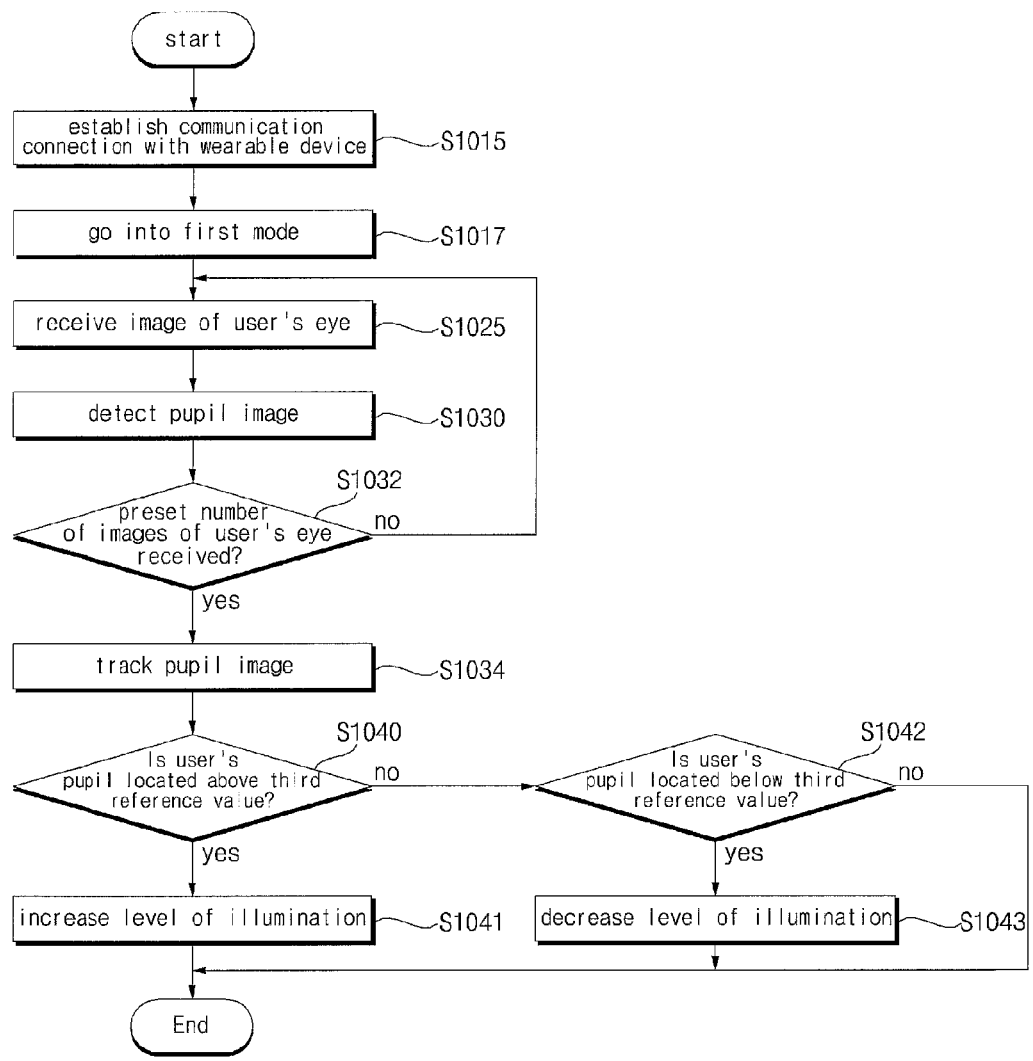
FIGS. 10a and 10b are signal-flow charts of the lighting system according to the second exemplary embodiment of the present invention.
Figure 10B:
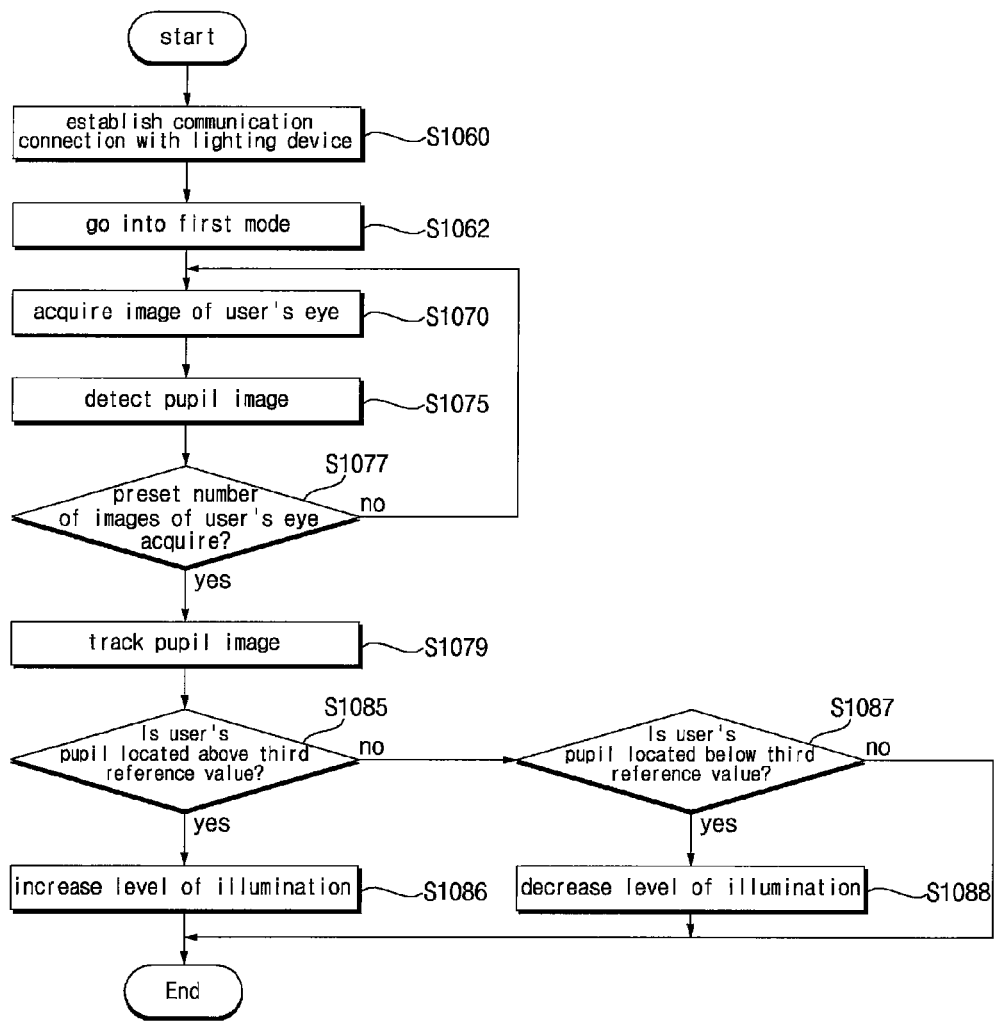

FIGS. 10*a* and 10*b* are flowcharts illustrating the operation of the lighting system according to the second exemplary embodiment of the present invention.

FIG. 10*a* is a flowchart referenced for describing the operation of the lighting device 200 according to the second exemplary embodiment of the present invention.

Referring to FIG. 10*a*, the controller 280 establishes a communication connection with the wearable device 100 via the communication unit 210 (S1015).

While connected to the wearable device 100 for communication, the controller 280 goes into the first mode (S1017). The first mode may be a mode for controlling lighting based on an image of the user's eye (e.g., pupil image) while the wearable device 100 and the lighting device 200 are connected for communication. The controller 280 may receive user input through the input unit 220 to go into the first mode.

While in the first mode, the controller 280 receives at least one image of the user's eye from the wearable device 100 (S1025). The at least one image of the user's eye may be an image that is acquired by the camera 160 included in the wearable device 100. The camera 160 may acquire a plurality of images of the user's eye for a predetermined period of time. The period of time and the number of acquired images are set values.

Once an image of the user's eye is received, the controller 280 detects a pupil image from the image of the user's eye (S1030). Specifically, the operation of detecting a pupil image may be performed by the object detector 282 included in the image processor 281, as explained with reference to FIG. 4.

After a pupil image is detected, the controller 280 determines whether a preset number of images of the user's eye are received or not (S1032). The preset number may be a value required to calculate the average pupil position. The preset number may be a set value.

If the preset number of images of the user's eye are received, the controller 280 tracks the position of at least one pupil image (S1034).

The controller 280 compares the position of a detected pupil image with a preset third reference value. The third reference value may be stored in the memory 240. The third reference value is the reference position of the pupil which is set based on test values or pupil images. For example, the third reference value may be the position of the pupil when the user looks straight ahead. Specifically, the operation of comparing the position of a pupil image with the third reference value may be performed by the object detector 282 included in the image processor 281, as explained with reference to FIG. 4.

The controller 280 calculates a change in the position of a pupil image based on the result of comparison of the position of the pupil image and the third reference value. For example, the controller 280 calculates whether a pupil image is located above or below the third reference value. Specifically, the operation of calculating a change in the position of a pupil image may be performed by the object tracker 283 included in the image processor 281, as explained with reference to FIG. 4.

If the preset number of images of the user's eye are not received, the controller 280 receives images of the user's eye (S1025).

Once a change in the position of the pupil image is calculated, the controller 280 determines whether the user's pupil is located above the third reference value or not (S1040).

If the image of the user's pupil is located above the third reference value, the controller 280 transmits a control signal to the drive unit 260 to increase the level of illumination from the light emitting unit 270 (S1041).

In step S1040, if the image of the user's pupil is not located above the third reference value, the controller 280 determines whether the image of the user's pupil is located below the third reference value or not (S1042).

If the image of the user's pupil is located below the third reference value, the controller 280 transmits a control signal to the drive unit 260 to decrease the level of illumination from the light emitting unit 270 (S1043).

The operation of calculating the level of illumination corresponding to the position of a pupil image may be performed by the application unit 285 included in the image processor 281, as explained with reference to FIG. 4. The controller 280 generates a control signal based on the result of comparison by the application unit 285.

FIG. 10b is a flowchart referenced for describing the operation of the wearable device 100 according to the second exemplary embodiment of the present invention.

Referring to FIG. 10b, the wearable device controller 180 establishes a communication connection with the lighting device 200 via the communication unit 110 (S1060).

While connected to the lighting device 200 for communication, the wearable device controller 180 goes into the first mode (S1062). The first mode may be a mode for controlling lighting based on an image of the user's eye (e.g., pupil image) while the wearable device 100 and the lighting device 200 are connected for communication. The wearable device controller 180 may receive user input through the wearable device input unit 120 to go into the first mode.

While in the first mode, the wearable device controller 180 receives at least one image of the user's eye from the wearable device 100 (S1070). The at least one image of the user's eye may be an image that is acquired by the camera 160 included in the wearable device 100. The camera 160 may acquire a plurality of images of the user's eye for a predetermined period of time. The period of time and the number of acquired images are set values.

Once an image of the user's eye is acquired, the wearable device controller 180 detects a pupil image from the image of the user's eye (S1075). Specifically, the operation of detecting a pupil image may be performed by the object detector 182 included in the image processor 181, as explained with reference to FIG. 4.

After a pupil image is detected, the wearable device controller 180 determines whether a preset number of images of the user's eye are received or not (S1077). The preset number may be a value required to calculate the average pupil position. The preset number may be a set value.

If the preset number of images of the user's eye are received, the wearable device controller 180 tracks the position of at least one pupil image (S1079).

The wearable device controller 180 compares the position of a detected pupil image with a preset third reference value. The third reference value may be stored in the wearable device memory 140. The third reference value is the reference position of the pupil which is set based on test values or pupil images. For example, the third reference value may be the position of the pupil when the user looks straight ahead. Specifically, the operation of comparing the position of a pupil image with the third reference value may be performed by the object detector 182 included in the image processor 181, as explained with reference to FIG. 4.

The wearable device controller 180 calculates a change in the position of a pupil image based on the result of comparison of the position of the pupil image and the third reference value. For example, the wearable device controller 180 calculates whether a pupil image is located above or below the third reference value. Specifically, the operation of calculating a change in the position of a pupil image may be performed by the object tracker 183 included in the image processor 181, as explained with reference to FIG. 4.

If the preset number of images of the user's eye are not received, the wearable device controller 180 receives images of the user's eye (S1070).

Once a change in the position of the pupil image is calculated, the wearable device controller 180 determines whether the user's pupil is located above the third reference value or not (S1085).

If the image of the user's pupil is located above the third reference value, the wearable device controller 180 transmits a signal to the lighting device 200 to increase the level of illumination (S1086).

In step S1085, if the image of the user's pupil is not located above the third reference value, the wearable device controller 180 determines whether the image of the user's pupil is located below the third reference value or not (S1087).

If the image of the user's pupil is located below the third reference value, the wearable device controller 180 transmits a signal to the lighting device 200 to decrease the level of illumination (S1088).

The operation of calculating the level of illumination corresponding to the position of a pupil image may be performed by the application unit 185 included in the image processor 181, as explained with reference to FIG. 4. The wearable device controller 180 generates a control signal based on the result of comparison by the application unit 185 and transmits it to the lighting device 200.

Figure 11:
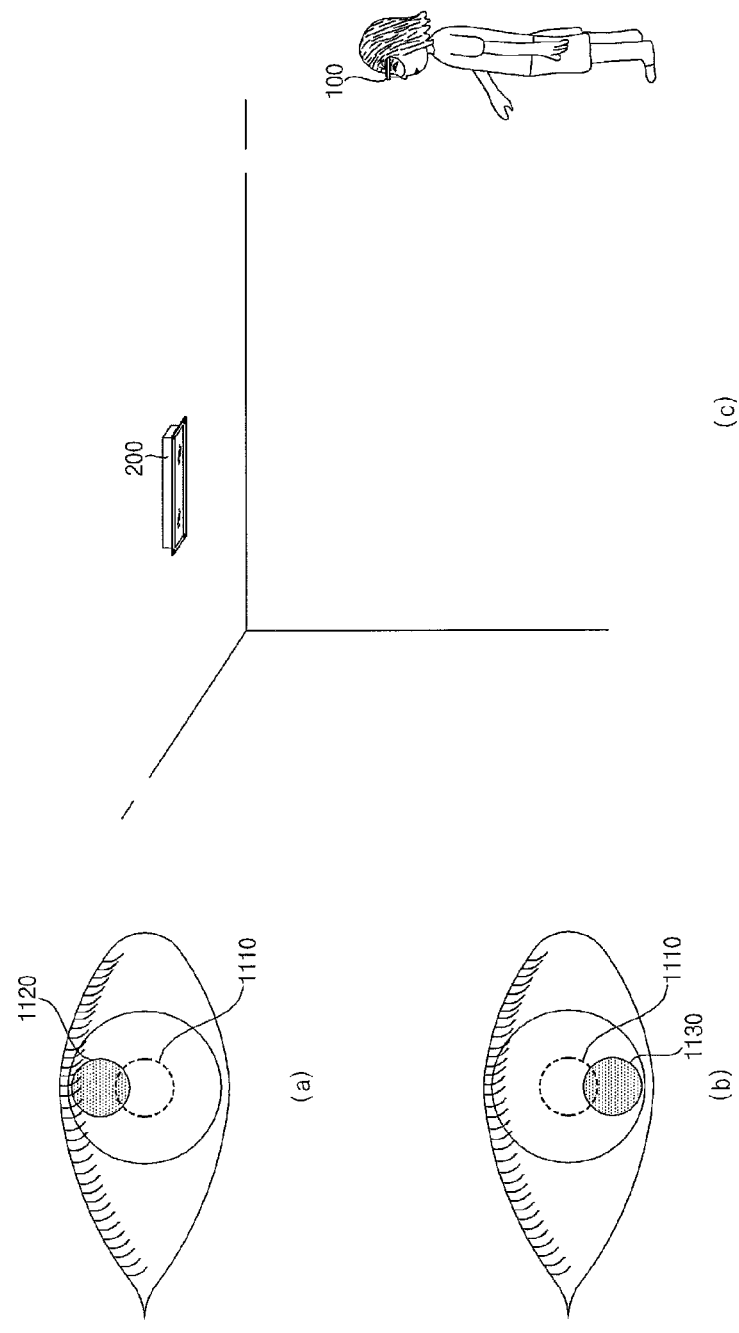
FIG. 11 is an illustration of the operation of the lighting system according to the second exemplary embodiment of the present invention.

FIG. 11 is an illustration of the operation of the lighting system according to the second exemplary embodiment of the present invention.

Referring to FIG. 11, the controller 280 establishes a communication connection with the wearable device 100 via the communication unit 210. While connected to the wearable device 100 for communication, the controller 280 goes into the first mode. While in the first mode, the controller 280 receives at least one image of the user's eye from the wearable device 100. Once an image of the user's eye is received, the controller 280 detects a pupil image from the image of the user's eye. If a preset number of images of the user's eye are received, the controller 280 tracks the position of at least one pupil image.

The controller 280 determines whether the user's pupil is located above the third reference value 1110 or not. If the pupil 1120 is located above a third reference value 1110 as shown in (a) of FIG. 11, the controller 280 transmits a control signal to the drive unit 260 to increase the level of illumination from the light emitting unit 270 as shown in (c) of FIG. 11.

If the image of the user's pupil is not located above the third reference value 1110, the controller 280 determines whether the image of the user's pupil is located below the third reference value 1110 or not.

If the image of the user's pupil is located below the third reference value 1110 as shown in (b) of FIG. 11, the controller 280 transmits a control signal to the drive unit 260 to decrease the level of illumination from the light emitting unit 270 as shown in (c) of FIG. 11.

Figure 12A:
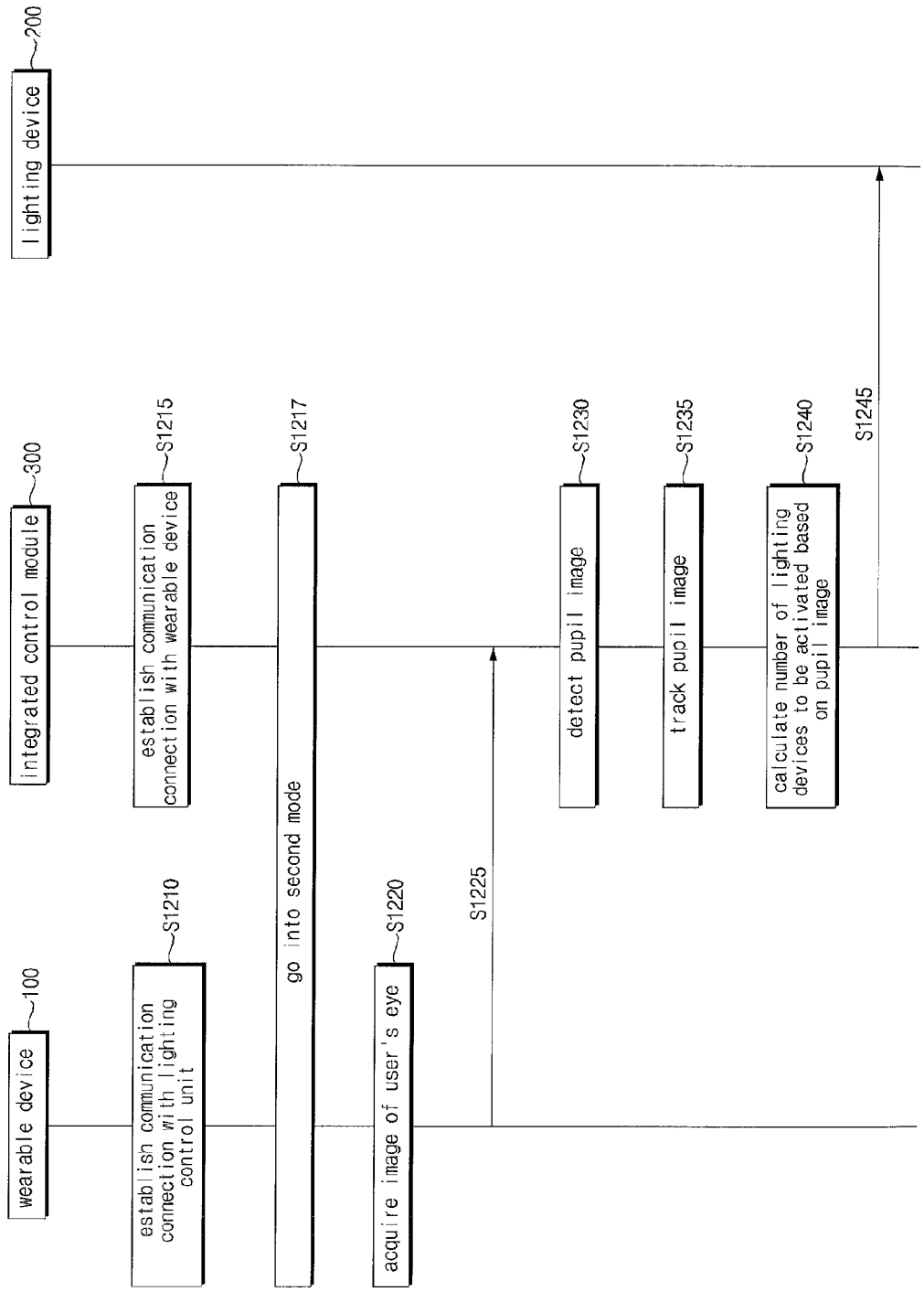
FIGS. 12a and 12b are signal-flow charts of a lighting system according to a third or fourth exemplary embodiment of the present invention.
Figure 12B:
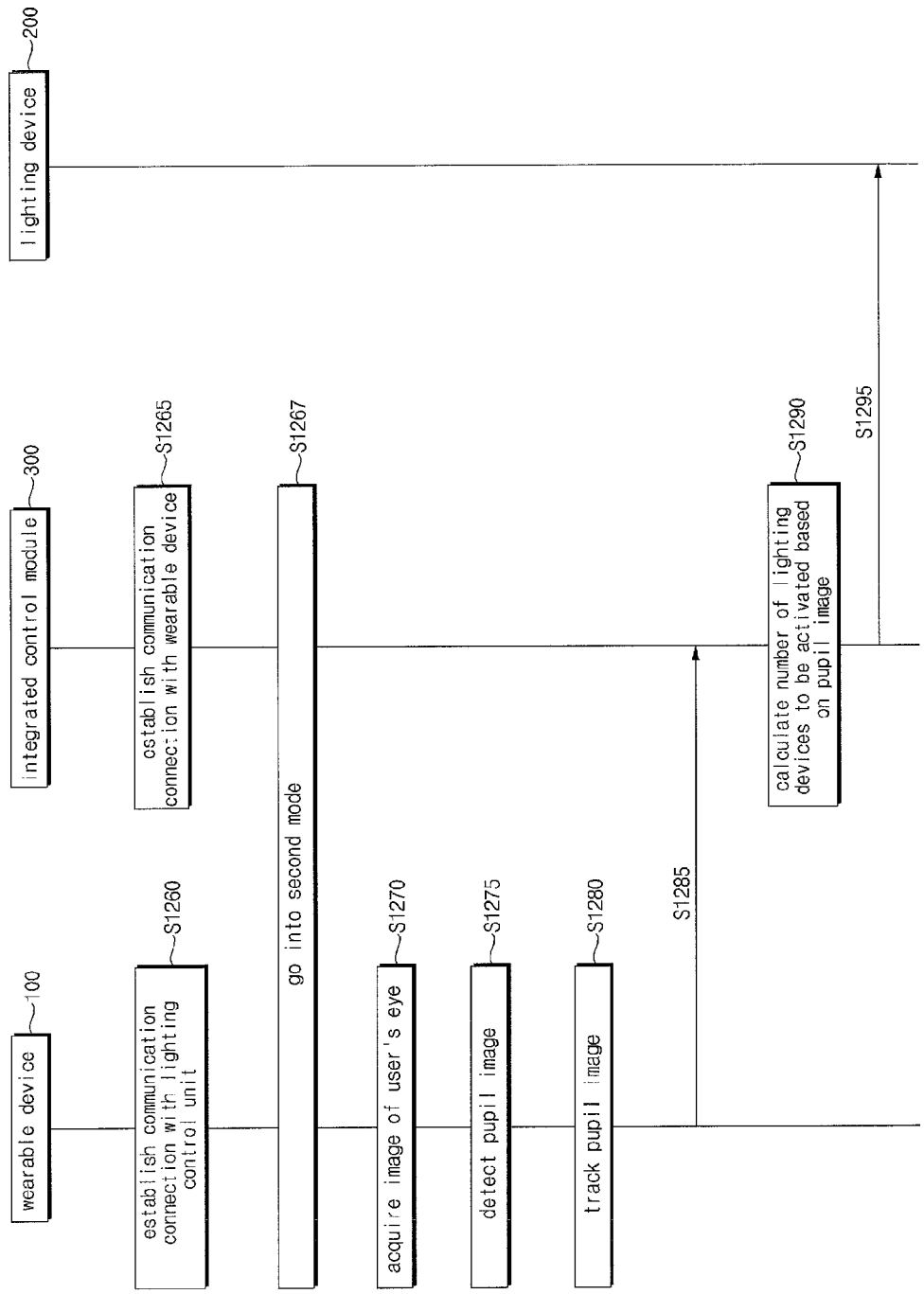

FIGS. 12*a* and 12*b* are signal-flow charts of a lighting system according to a third or fourth exemplary embodiment of the present invention.

FIG. 12*a* illustrates that the integrated control module 300 includes the image processor 381. FIG. 12*b* illustrates that the wearable device 100 includes the image processor 181.

Referring to FIG. 12*a*, the wearable device 100 forms a communication channel with the integrated control module 300. That is, the wearable device 100 establishes a communication connection with the integrated control module 300 (S1210 and S1215).

While connected to the integrated control module 300 for communication, the wearable device 100 goes into the second mode (S1217). Alternatively, the integrated control module 300 goes into the second mode. The second mode may be a mode for controlling the lighting device 200 based on an image of the user's eye (e.g., pupil image) while the wearable device 100 and the integrated control module 300 are connected for communication. In this case, the wearable device controller 180 may receive user input through the wearable device input unit 120 to go into the second mode.

While in the second mode, the wearable device 100 acquires at least one image of the user's eye by the camera 160 (S1220). The camera 160 may acquire a plurality of images for a predetermined period of time. The period of time and the number of acquired images are set values.

Once at least one image of the user's eye is acquired, the wearable device 100 transmits the at least one image of the user's eye to the integrated control module 300 through the wireless communication unit 110 (S1225). The integrated control module 300 receives at least one image of the user's eye from the wearable device 100 via the integrated control module communication unit 310.

Once at least one image of the user's eye is received, the integrated control module 300 detects a pupil image from the at least one image of the user's eye (S1230).

Once a pupil image is detected, the integrated control module 300 tracks the pupil image (S1235).

Afterwards, the integrated control module 300 calculates the number of lighting devices to be activated among the plurality of lighting devices 200, based on the pupil image (S1240).

Next, the integrated control module 300 transmits a control signal to the lighting device 200 based on the result of calculation (S1245).

Referring to FIG. 12*b*, the wearable device 100 forms a communication channel with the integrated control module 300. That is, the wearable device 100 establishes a communication connection with the integrated control module 300 (S1260 and S1265).

While connected to the integrated control module 300 for communication, the wearable device 100 goes into the second mode (S1267). Alternatively, the lighting device 200 goes into the second mode.

While in the second mode, the wearable device 100 acquires at least one image of the user's eye by the camera 160 (S1270). The camera 160 may acquire a plurality of images of the user's eye for a predetermined period of time.

Once at least one image of the user's eye is acquired, the wearable device 100 detects a pupil image from the at least one image of the user's eye (S1275).

Once a pupil image is detected, the wearable device 100 tracks the pupil image (S1280).

Afterwards, the wearable device 100 transmits the pupil image tracking result to the integrated control module 300 (S1285).

Afterwards, the integrated control module 300 calculates the number of lighting devices to be activated among the plurality of lighting devices 200, based on the pupil image (S1290).

Next, the integrated control module 300 transmits a control signal to the lighting device 200 based on the result of calculation (S1295).

Figure 13A:
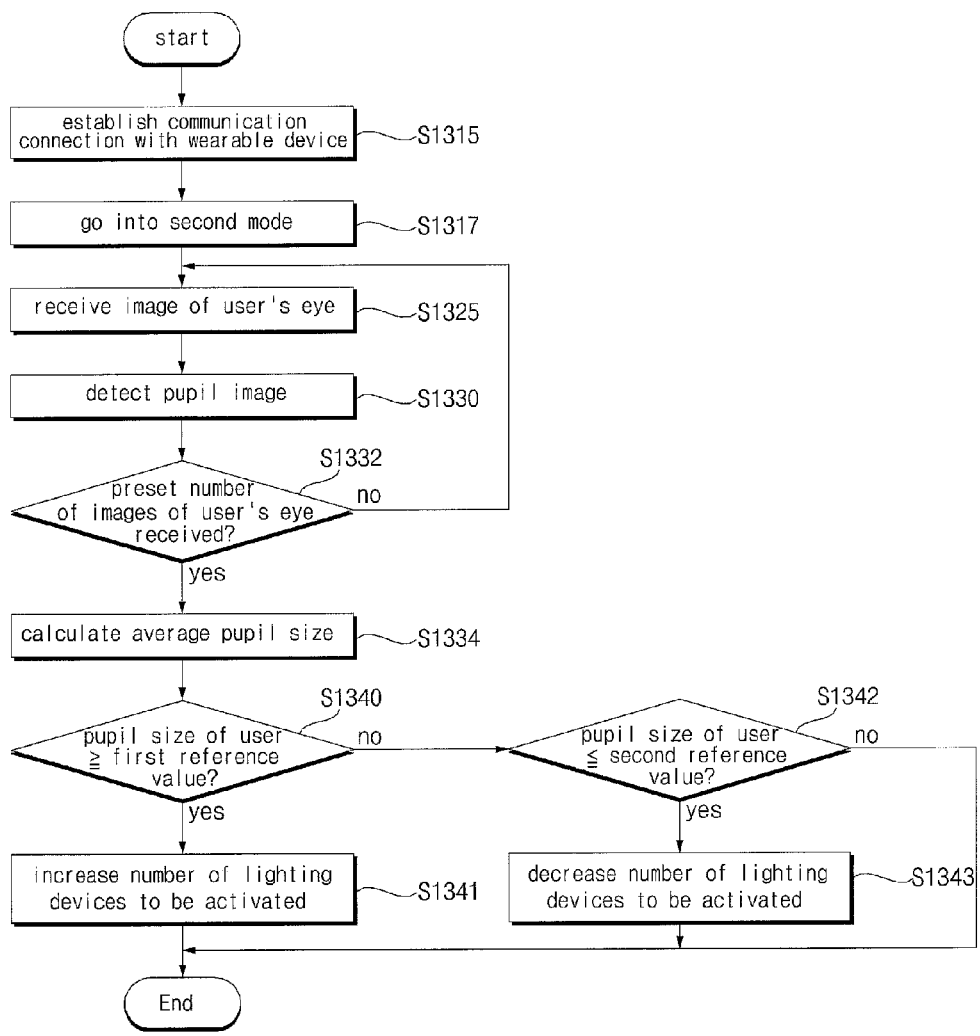
FIGS. 13a and 13b are signal-flow charts of the lighting system according to the third exemplary embodiment of the present invention.
Figure 13B:
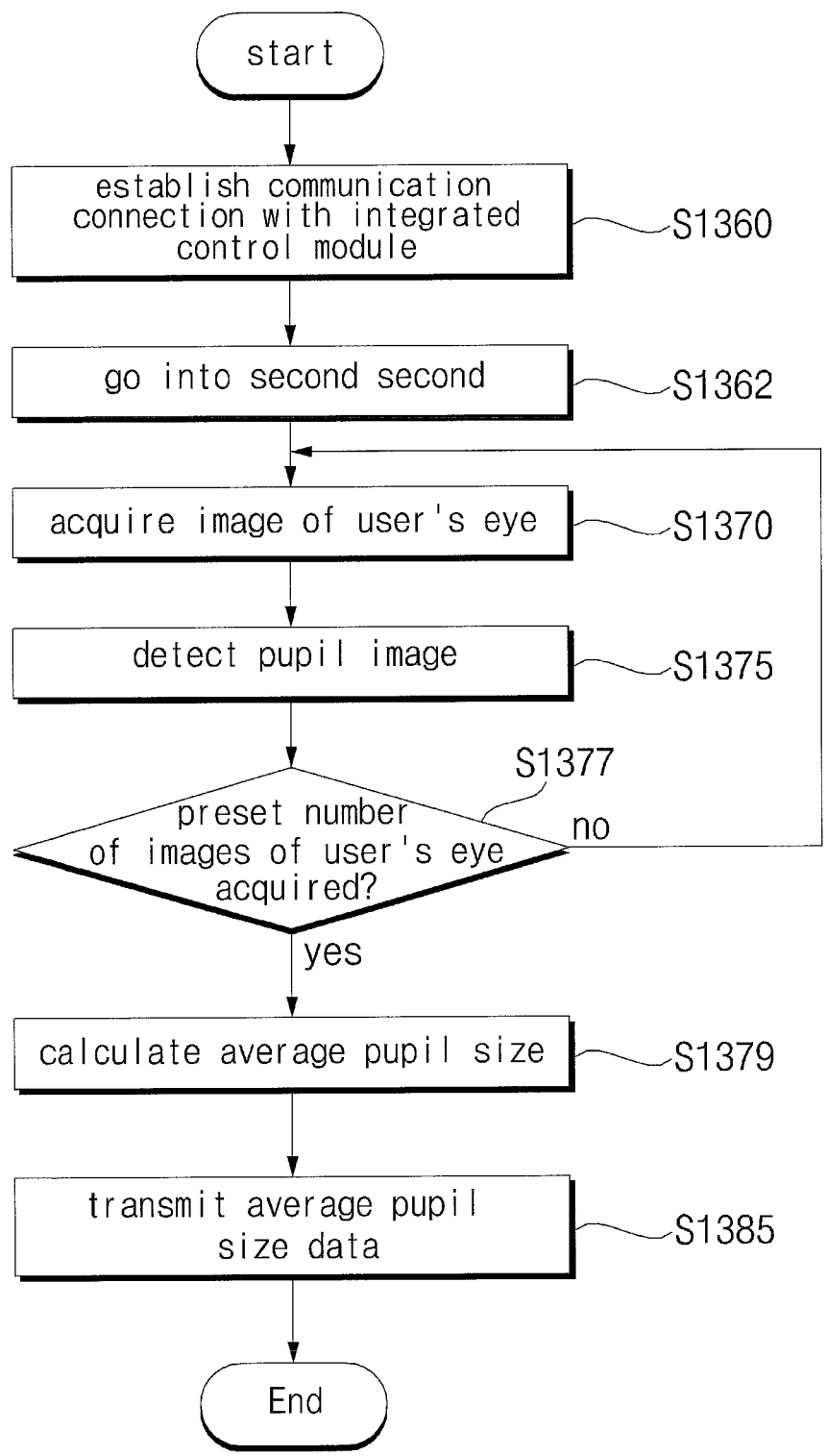

FIGS. 13*a* and 13*b* are signal-flow charts of the lighting system according to the third exemplary embodiment of the present invention.

FIG. 13*a* is a flowchart referenced for describing the operation of the integrated control module 300 according to the third exemplary embodiment of the present invention.

Referring to FIG. 13*a*, the integrated control module processor 380 establishes a communication connection with the wearable device 100 via the integrated control module communication unit 310 (S1315).

While connected to the wearable device 100 for communication, the integrated control module processor 380 goes into the second mode (S1317). The second mode may be a mode for controlling lighting based on an image of the user's eye (e.g., pupil image) while the wearable device 100 and the integrated control module 300 are connected for communication. The integrated control module processor 380 may receive user input through an integrated control module processor input unit (not shown) to go into the second mode.

While in the second mode, the integrated control module processor 380 receives at least one image of the user's eye from the wearable device 100 (S1325). The at least one image of the user's eye may be an image that is acquired by the camera 160 included in the wearable device 100. The camera 160 may acquire a plurality of images of the user's eye for a predetermined period of time. The period of time and the number of acquired images are set values.

Once an image of the user's eye is received, the integrated control module processor 380 detects a pupil image from the image of the user's eye (S1330). Specifically, the operation of detecting a pupil image may be performed by the object detector 382 included in the image processor 381, as explained with reference to FIG. 5.

After a pupil image is detected, the integrated control module controller 380 determines whether a preset number of images of the user's eye are received or not (S1332). The preset number may be a value required to calculate the average pupil size. The preset number may be a set value.

If the preset number of images of the user's eye are received, the integrated control module controller 380 calculates the average pupil size from at least one pupil image (S1334). Specifically, the operation of calculating the average pupil size may be performed by the object recognizer 383 included in the image processor 381, as explained with reference to FIG. 5.

If the preset number of images of the user's eye are not received, the integrated control module controller 380 receives images of the user's eye (S1325).

Once the average pupil size is calculated, the integrated control module controller 380 determines whether or not the pupil size of the user is greater than or equal to a first reference value (S1340). The first reference value may be stored in the integrated control module memory 340. The first reference value is a reference pupil size that is set according to test values or accumulated pupil images. For example, if the pupil size is greater than or equal to the first reference value, it can be assumed that the amount of light directed to the human eye is small. Specifically, the determination of pupil size may be performed by the object recognizer 383 included in the image processor 381, as explained with reference to FIG. 5.

If the pupil size of the user is greater than or equal to the first reference value, the integrated control module controller 380 increases the number of lighting devices to be activated among the plurality of lighting devices 200 (S1341).

In step S1340, if the pupil size of the user is not greater than or equal to the first reference value, the integrated control module controller 380 determines whether the average pupil size of the user is less than or equal to a second reference value (S1342). The second reference value may be stored in the integrated control module memory 340. The second reference value is a reference pupil size that is set according to test values or accumulated pupil images. For example, if the pupil size is less than or equal to the second reference value, it can be assumed that the amount of light directed to the human eye is large. Specifically, the determination of pupil size may be performed by the object recognizer 383 included in the image processor 381, as explained with reference to FIG. 5.

If the pupil size of the user is less than or equal to the second reference value, the integrated control module controller 380 decreases the number of lighting devices to be activated among the plurality of lighting devices 200 (S1343).

The operation of calculating the level of illumination corresponding to pupil size may be performed by the application unit 385 included in the image processor 381, as explained with reference to FIG. 5. The integrated control module controller 380 generates a control signal based on the result of calculation by the application unit 385.

FIG. 13b is a flowchart referenced for describing the operation of the wearable device 100 according to the third exemplary embodiment of the present invention.

Referring to FIG. 13b, the wearable device controller 180 establishes a communication connection with the integrated control module 300 via the wireless communication unit 110 (S1360).

While connected to the integrated control module 300 for communication, the wearable device controller 180 goes into the second mode (S1362). The second mode may be a mode for controlling lighting based on an image of the user's eye (e.g., pupil image) while the wearable device 100 and the integrated control module 300 are connected for communication. The wearable device controller 180 may receive user input through the wearable device input unit 120 to go into the second mode.

While in the second mode, the wearable device controller 180 receives at least one image of the user's eye from the wearable device 100 (S1370). The at least one image of the user's eye may be an image that is acquired by the camera 160 included in the wearable device 100. The camera 160 may acquire a plurality of images of the user's eye for a predetermined period of time. The period of time and the number of acquired images are set values.

Once an image of the user's eye is acquired, the wearable device controller 180 detects a pupil image from the image of the user's eye (S1375). Specifically, the operation of detecting a pupil image may be performed by the object detector 182 included in the image processor 181, as explained with reference to FIG. 4.

After a pupil image is detected, the wearable device controller 180 determines whether a preset number of images of the user's eye are received or not (S1377). The preset number may be a value required to calculate the average pupil size. The preset number may be a set value.

If the preset number of images of the user's eye are acquired, the wearable device controller 180 calculates the average pupil size from at least one pupil image (S1379). Specifically, the operation of calculating the average pupil size may be performed by the object recognizer 183 included in the image processor 181, as explained with reference to FIG. 4.

If the preset number of images of the user's eye are not received, the wearable device controller 180 receives images of the user's eye (S1370).

Once the average pupil size is calculated, the wearable device controller 180 transmits average pupil size data to the integrated control module 300 (S1385).

The integrated control module 300 receives the average pupil size data. The operation of controlling the number of lighting devices to be activated when the integrated control module 300 has received the average pupil size data is identical to steps S1340, S1341, S1342, and S1343 of FIG. 13a.

Figure 14:
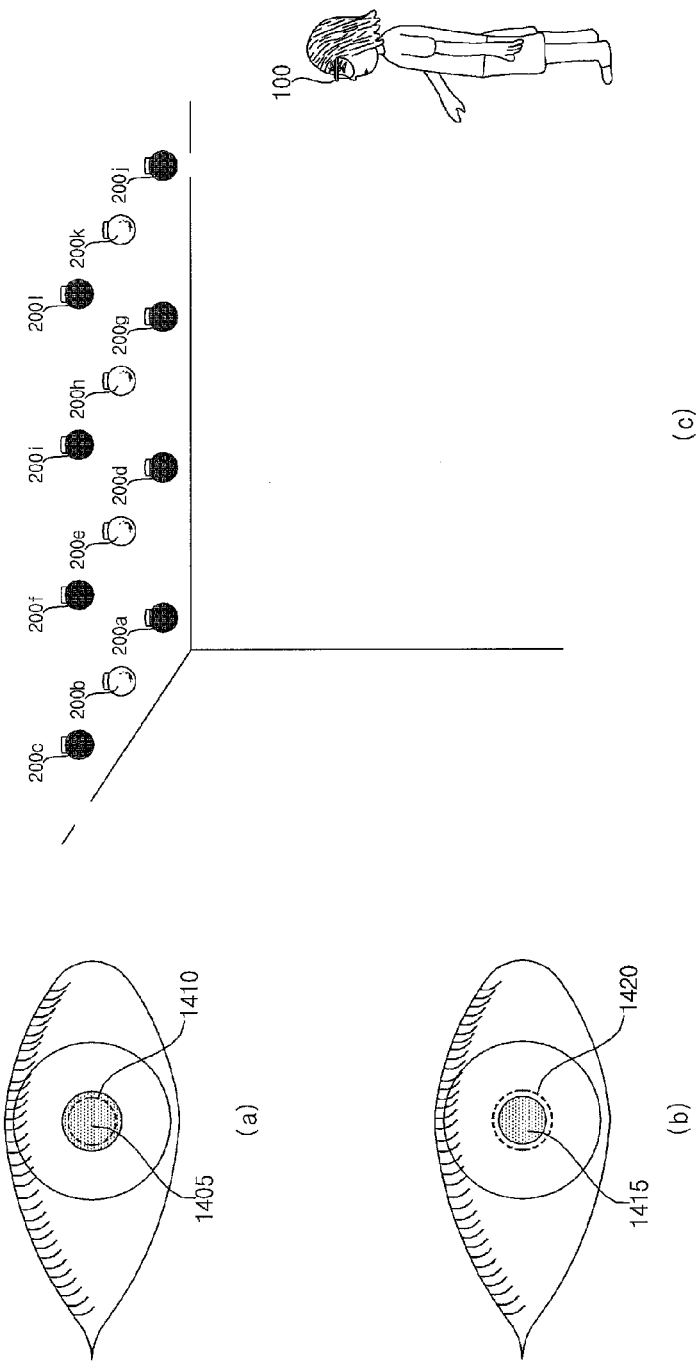
FIG. 14 is an illustration of the operation of the lighting system according to the third exemplary embodiment of the present invention.

FIG. 14 is an illustration of the operation of the lighting system according to the third exemplary embodiment of the present invention.

Referring to FIG. 14, the integrated control module processor 380 establishes a communication connection with the wearable device 100 via the integrated control module communication unit 310. While connected to the wearable device 100 for communication, the integrated control module processor 380 goes into the second mode. While in the second mode, the integrated control module processor 380 receives at least one image of the user's eye from the wearable device 100. Once an image of the user's eye is received, the integrated control module processor 380 detects a pupil image from the image of the user's eye. If a preset number of images of the user's eye are received, the integrated control module processor 380 calculates the average pupil size from at least one pupil image.

The integrated control module processor 380 determines whether or not the user's pupil size 1405 is greater than or equal to a first reference value 1410.

If the pupil size 1405 of the user is greater than or equal to the first reference value as shown in (a) of FIG. 14, the integrated control module processor 380 increases the number of lighting devices to be activated among the plurality of lighting devices 200 as shown in (c) of FIG. 14. For example, it is assumed that only the second, fifth, eighth, and eleventh lighting devices 200b, 200e, 200h, and 200k out of the plurality of lighting devices 200 (200a to 200l) are activated. In this case, if the pupil size 1405 of the user is greater than or equal to the first reference value, the integrated control module processor 380 may further activate the first, third, fourth, sixth, seventh, ninth, tenth, and twelfth lighting devices 200*a*, 200*c*, 200*d*, 200*f*, 200*g*, 200*i*, 200*j*, and 200*l*.

If the pupil size of the user is not greater than or equal to the first reference value 1410, the integrated control module processor 380 determines whether the average pupil size 1415 of the user is less than or equal to a second reference value 1420.

If the pupil size 1415 of the user is less than or equal to the second reference value 1420 as shown in (b) of FIG. 14, the integrated control module processor 380 decreases the number of lighting devices to be activated among the plurality of lighting devices 200 as shown in (c) of FIG. 14. For example, it is assumed that all of the first to twelfth lighting devices 200 (200*a* to 200*l*) are activated. In this case, if the pupil size 1415 of the user is less than or equal to the second reference value, the integrated control module processor 380 may turn off the first, third, fourth, sixth, seventh, ninth, tenth, and twelfth lighting devices 200*a*, 200*c*, 200*d*, 200*f*, 200*g*, 200*i*, 200*j*, and 200*l* to deactivate them.

Figure 15A:
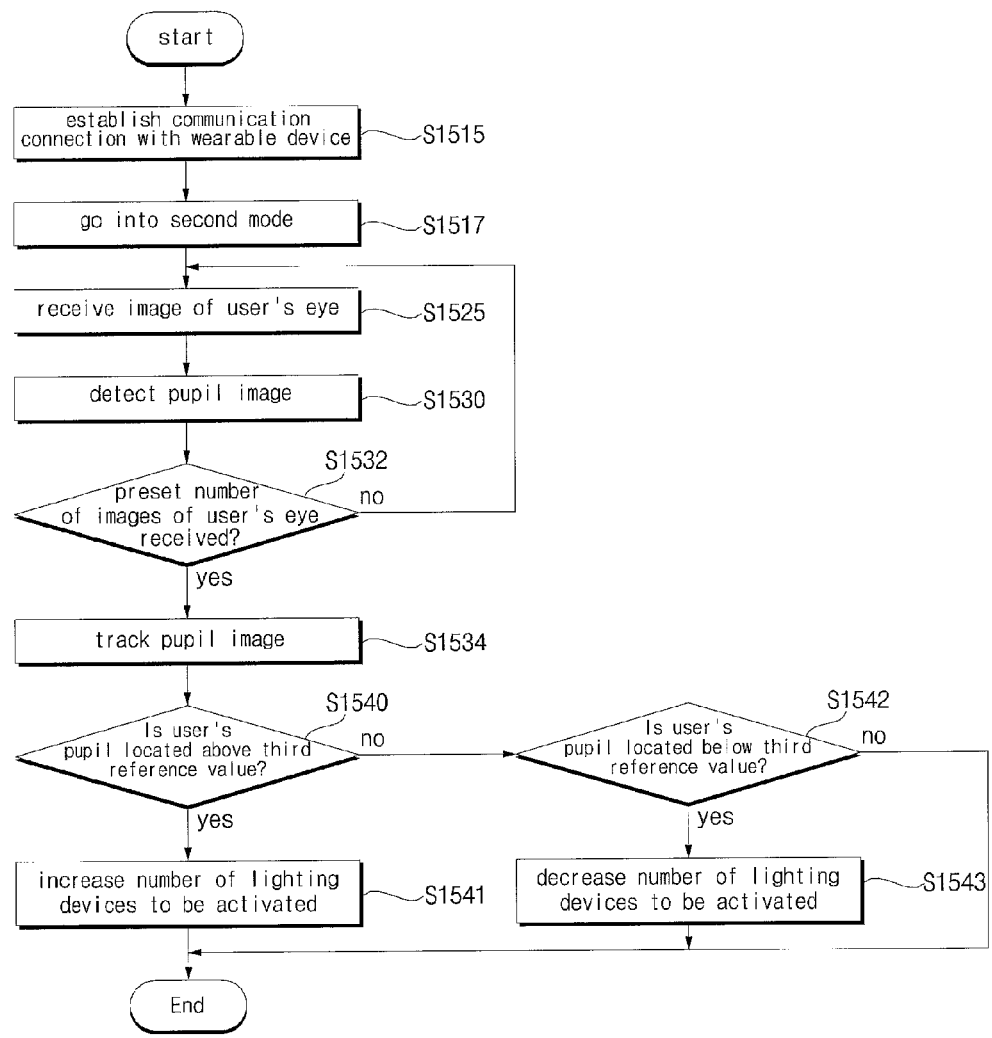
FIGS. 15a and 15b are signal-flow charts of the lighting system according to the fourth exemplary embodiment of the present invention.
Figure 15B:
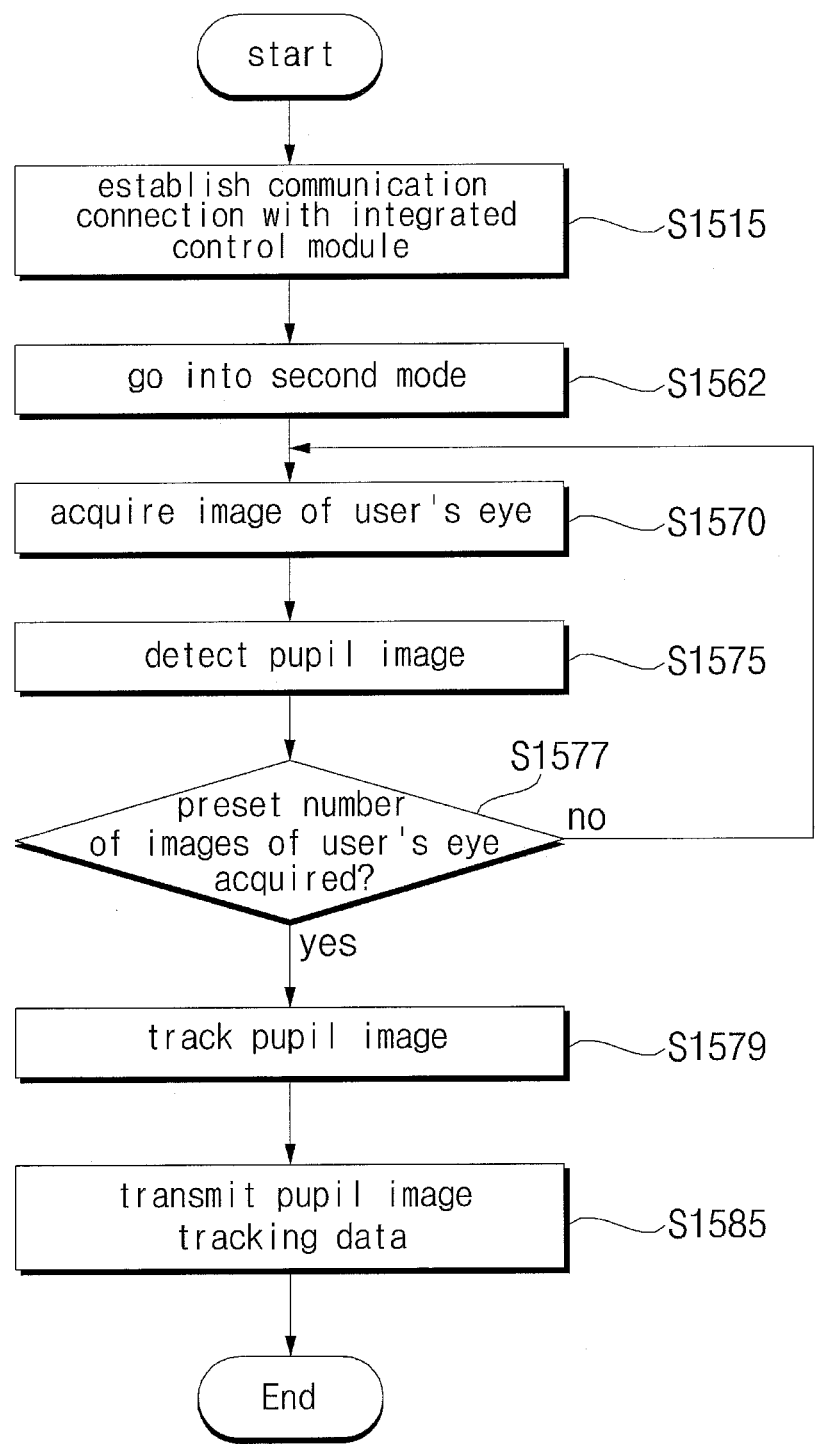

FIGS. 15*a* and 15*b* are signal-flow charts of the lighting system according to the fourth exemplary embodiment of the present invention.

FIG. 15*a* is a flowchart referenced for describing the operation of the integrated control module 300 according to the fourth exemplary embodiment of the present invention.

Referring to FIG. 15*a*, the integrated control module processor 380 establishes a communication connection with the wearable device 100 via the integrated control module communication unit 310 (S1515).

While connected to the wearable device 100 for communication, the integrated control module processor 380 goes into the second mode (S1517). The second mode may be a mode for controlling lighting based on an image of the user's eye (e.g., pupil image) while the wearable device 100 and the integrated control module 300 are connected for communication. The integrated control module processor 380 may receive user input through the input unit 220 to go into the second mode.

While in the second mode, the integrated control module processor 380 receives at least one image of the user's eye from the wearable device 100 (S1525). The at least one image of the user's eye may be an image that is acquired by the camera 160 included in the wearable device 100. The camera 160 may acquire a plurality of images of the user's eye for a predetermined period of time. The period of time and the number of acquired images are set values.

Once an image of the user's eye is received, the integrated control module processor 380 detects a pupil image from the image of the user's eye (S1530). Specifically, the operation of detecting a pupil image may be performed by the object detector 382 included in the image processor 381, as explained with reference to FIG. 5.

After a pupil image is detected, the integrated control module controller 380 determines whether a preset number of images of the user's eye are received or not (S1532). The preset number may be a value required to calculate the average pupil position. The preset number may be a set value.

If the preset number of images of the user's eye are received, the integrated control module processor 380 tracks the position of at least one pupil image (S1534).

The integrated control module processor 380 compares the position of a detected pupil image with a preset third reference value. The third reference value may be stored in the integrated control module memory 340. The third reference value is the reference position of the pupil which is set based on test values or pupil images. For example, the third reference value may be the position of the pupil when the user looks straight ahead. Specifically, the operation of comparing the position of a pupil image with the third reference value may be performed by the object detector 382 included in the image processor 381, as explained with reference to FIG. 5.

The integrated control module processor 380 calculates a change in the position of a pupil image based on the result of comparison of the position of the pupil image and the third reference value. For example, the integrated control module processor 380 calculates whether a pupil image is located above or below the third reference value. Specifically, the operation of calculating a change in the position of a pupil image may be performed by the object tracker 383 included in the image processor 381, as explained with reference to FIG. 4.

If the preset number of images of the user's eye are not received, the integrated control module processor 380 receives images of the user's eye (S1525).

Once a change in the position of the pupil image is calculated, the integrated control module processor 380 determines whether the user's pupil is located above the third reference value or not (S1540).

If the image of the user's pupil is located above the third reference value, the integrated control module processor 380 increases the number of lighting devices to be activated among the plurality of lighting devices (S1541).

In step S1540, if the image of the user's pupil is not located above the third reference value, the integrated control module processor 380 determines whether the image of the user's pupil is located below the third reference value or not (S1542).

If the image of the user's pupil is located below the third reference value, the integrated control module processor 380 decreases the number of lighting devices to be activated among the plurality of lighting devices (S1543).

The operation of calculating the level of illumination corresponding to the position of a pupil image may be performed by the application unit 385 included in the image processor 381, as explained with reference to FIG. 5. The integrated control module processor 380 generates a control signal based on the result of comparison by the application unit 285.

FIG. 15*b* is a flowchart referenced for describing the operation of the wearable device 100 according to the second exemplary embodiment of the present invention.

Referring to FIG. 15*b*, the wearable device controller 180 establishes a communication connection with the integrated control module 300 via the wireless communication unit 110 (S1560).

While connected to the integrated control module 300 for communication, the wearable device controller 180 goes into the second mode (S1562). The second mode may be a mode for controlling lighting based on an image of the user's eye (e.g., pupil image) while the wearable device 100 and the integrated control module 300 are connected for communication. The wearable device controller 180 may receive user input through the wearable device input unit 120 to go into the second mode.

While in the second mode, the wearable device controller 180 receives at least one image of the user's eye from the wearable device 100 (S1570). The at least one image of the user's eye may be an image that is acquired by the camera 160 included in the wearable device 100. The camera 160 may acquire a plurality of images of the user's eye for a predetermined period of time. The period of time and the number of acquired images are set values.

Once an image of the user's eye is acquired, the wearable device controller 180 detects a pupil image from the image of the user's eye (S1575). Specifically, the operation of detecting a pupil image may be performed by the object detector 182 included in the image processor 181, as explained with reference to FIG. 4.

After a pupil image is detected, the wearable device controller 180 determines whether a preset number of images of the user's eye are received or not (S1577). The preset number may be a value required to calculate the average pupil position. The preset number may be a set value.

If the preset number of images of the user's eye are received, the wearable device controller 180 tracks the position of at least one pupil image (S1579).

If the preset number of images of the user's eye are not received, the wearable device controller 180 receives images of the user's eye (S1570).

Once the position of at least one pupil image is detected, the wearable device controller 180 transmits pupil image position tracking data to the integrated control module 300 (S1585).

The integrated control module 300 receives the pupil image position tracking data. The operation of controlling the number of lighting devices to be activated when the integrated control module 300 has received the pupil image position tracking data is identical to steps S1540, S1541, S1542, and S1543 of FIG. 15*a*.

Figure 16:
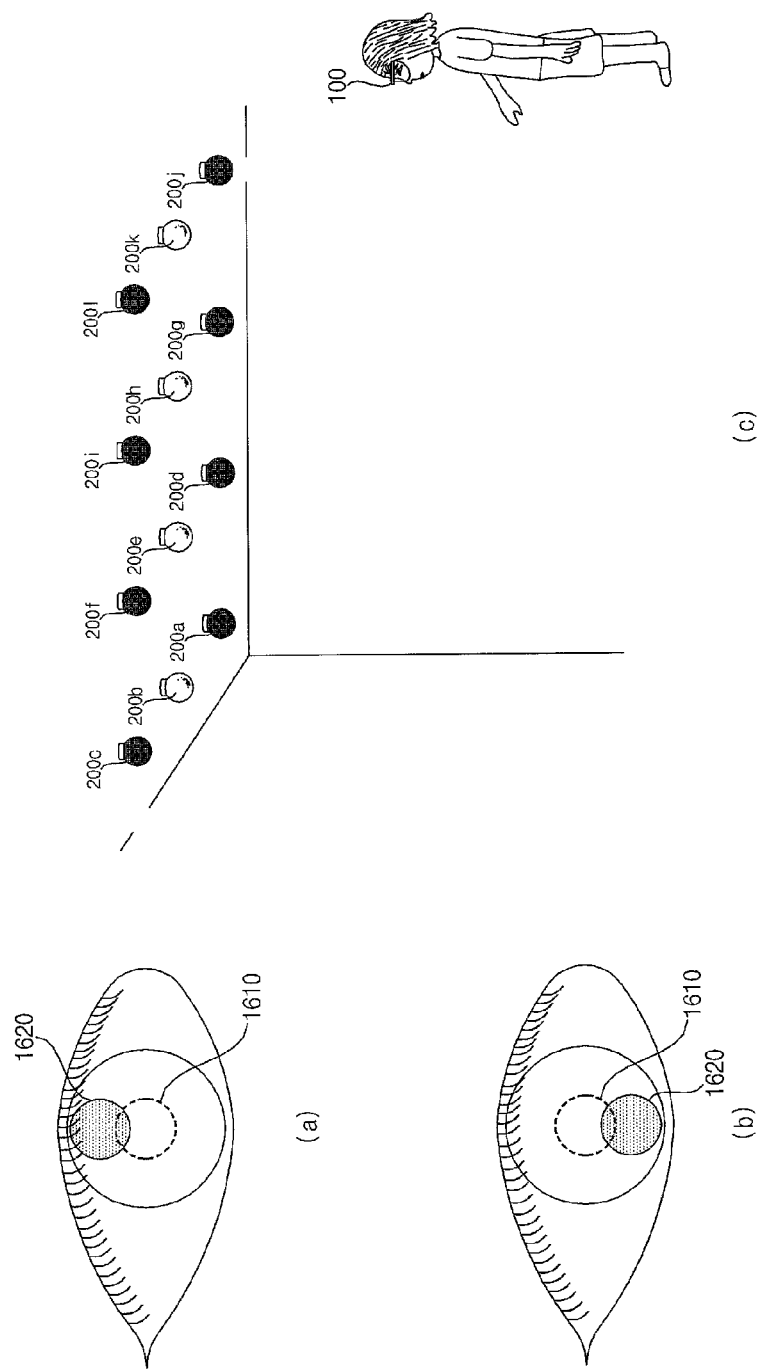
FIG. 16 is an illustration of the operation of the lighting system according to the fourth exemplary embodiment of the present invention.

FIG. 16 is an illustration of the operation of the lighting system according to the fourth exemplary embodiment of the present invention.

Referring to FIG. 16, the integrated control module processor 380 establishes a communication connection with the wearable device 100 via the integrated control module communication unit 310. While connected to the wearable device 100 for communication, the integrated control module processor 380 goes into the second mode. While in the second mode, the integrated control module processor 380 receives at least one image of the user's eye from the wearable device 100. Once an image of the user's eye is received, the integrated control module processor 380 detects a pupil image from the image of the user's eye. If a preset number of images of the user's eye are received, the integrated control module processor 380 tracks the position of at least one pupil image.

The integrated control module processor 380 determines whether the user's pupil 1620 is located above a third reference value 1610 or not. If the pupil 1620 is located above the third reference value 1610 as shown in (a) of FIG. 16, the integrated control module processor 380 increases the number of lighting devices to be activated among the plurality of lighting devices 200 as shown in (c) of FIG. 16. For example, it is assumed that only the second, fifth, eighth, and eleventh lighting devices 200*b*, 200*e*, 200*h*, and 200*k* out of the plurality of lighting devices 200 (200*a* to 200*l*) are activated. In this case, if the pupil 1620 is located above the third reference value 1610, the integrated control module processor 380 may further activate the first, third, fourth, sixth, seventh, ninth, tenth, and twelfth lighting devices 200*a*, 200*c*, 200*d*, 200*f*, 200*g*, 200*i*, 200*j*, and 200*l*.

If the pupil is not located above the third reference value, the integrated control module processor 380 determines whether the image of the user's pupil 1620 is located below the third reference value 1610.

If the image of the user's pupil 1620 is located below the third reference value 1610 as shown in (b) of FIG. 16, the integrated control module processor 380 decreases the number of lighting devices to be activated among the plurality of lighting devices 200 as shown in (d) of FIG. 16. For example, it is assumed that all of the first to twelfth lighting devices 200 (200*a* to 200*l*) are activated. In this case, if the image of the user's pupil 1620 is located below the third reference value 1610, the integrated control module processor 380 may turn off the first, third, fourth, sixth, seventh, ninth, tenth, and twelfth lighting devices 200*a*, 200*c*, 200*d*, 200*f*, 200*g*, 200*i*, 200*j*, and 200*l* to deactivate them.

Figure 17:
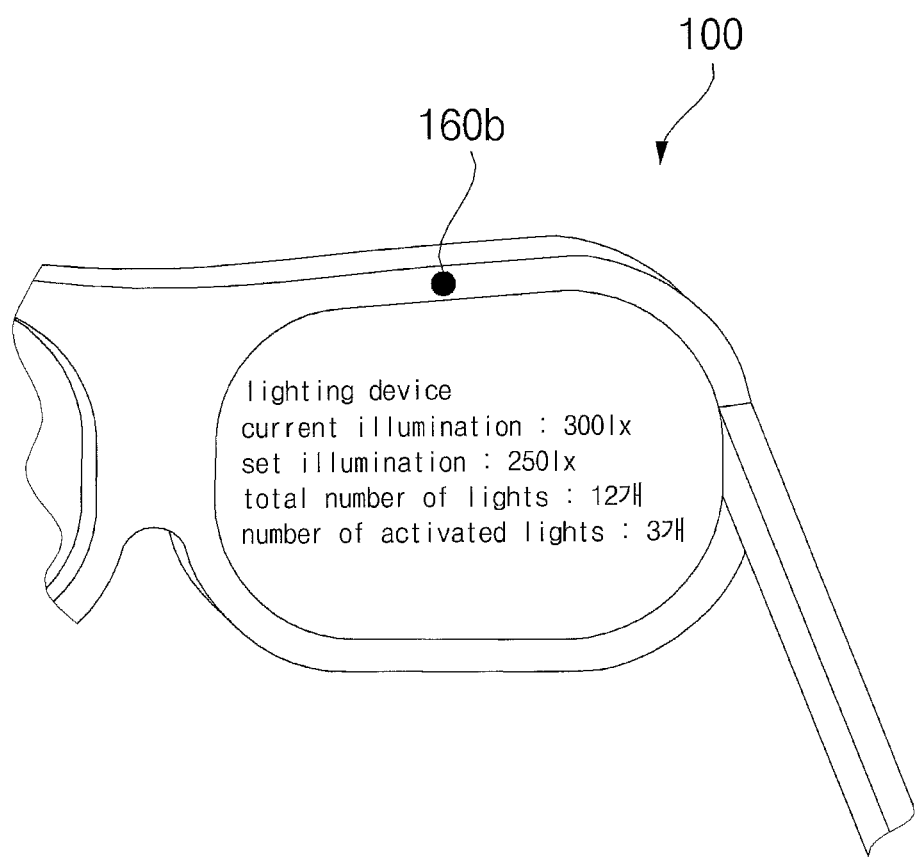
FIG. 17 is an illustration of a lighting control screen displayed on a wearable device according to an exemplary embodiment of the present invention.

FIG. 17 is an illustration of a lighting control screen displayed on a wearable device according to an exemplary embodiment of the present invention.

Referring to FIG. 17, the wearable device controller 180 establishes a communication connection with the lighting device 200 or the integrated control module 300. While connected to the lighting device 200 or the integrated control module 300 for communication, the wearable device controller 180 goes into the first mode or the second mode. In this case, the wearable device controller 180 may go into the first mode upon receiving user input through the wearable device input unit 120. While in the first mode or the second mode, the wearable device controller 180 displays a control screen related to the control of the lighting device 200. The current illumination, set illumination, total number of lights, and number of activated lights may be displayed on the control screen.

Meanwhile, this invention can be implemented in processor-readable codes in a processor-readable recording medium provided on the SCA-based application system. Here, the processor-readable recording medium includes all kinds of recording devices for storing processor-readable data. Examples of the processor-readable recording medium include includes a computer-readable storage medium such as ROM, RAM, a CD-ROM, magnetic tapes, floppy disks, and optical data storage devices, and a means implemented in the form of carrier waves, for example, transmission via the Internet. The processor-readable recording medium may be distributed among computer systems connected to a network, and processor-readable codes may be stored and executed in a decentralized fashion.

In order to overcome the above-described problems, an aspect of the present invention provides a lighting system and a control method thereof which allow for lighting control based on images of a user's eye.

In one aspect, an exemplary embodiment of the present invention is directed to a lighting device including: a communication unit that communicates with a wearable device with at least one camera and receives an image of a user's eye captured by the camera; a light emitting unit including one or more light emitting elements; and a controller that detects a pupil image based on the image of the user's eye and controls the light emitting unit based on the pupil image.

In another aspect, an exemplary embodiment of the present invention is directed to a lighting system including: a plurality of lighting devices each including one or more light emitting units; and an integrated control module; and an integrated control module that communicates with the wearable device with at least one camera, receives an image of a user's eye captured by the camera, detects a pupil image based on the image, and controls the number of lighting devices to be activated among the plurality of lighting devices based on the pupil image.

In still another aspect, an exemplary embodiment of the present invention is directed to a wearable device including:

a camera that receives an image of a user's eye; a wireless communication unit that sends and receives data by communicating with at least one lighting device; and a wearable device controller that detects a pupil image based on the image of the user's eye, generates a control signal for controlling the level of illumination of the lighting device, and controls the wireless communication unit to transmit the control signal to the lighting device.

The effects of at least one exemplary embodiment of the present invention having the above-described configuration are as follows:

First, a lighting system according to an exemplary embodiment of the present invention can receive images of a user's eye and control lighting based on the images of the eye. Accordingly, the present invention has an active lighting control effect.

Second, the right level of illumination suitable for the user can be provided by controlling lighting according to pupil size.

Third, the lighting system according to the exemplary embodiment of the present invention actively controls lighting according to a pupil image. Accordingly, the present invention can increase user convenience.

The effects of the present invention are not limited to the above-mentioned effects, and other effects not mentioned above can be clearly understood from the definitions in the claims by one skilled in the art.

Furthermore, although the exemplary embodiments of the present invention have been shown and described, the present invention is not limited to the above specific embodiments, and a person having ordinary skill in the art to which the invention belongs may modify the embodiments in various ways without deuniting from the gist of the present invention which is written in the claims. The modified embodiments should not be interpreted individually from the technical spirit or prospect of the present invention.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A lighting device comprising:
 a communication unit to communicate with a wearable device having at least one camera, the communication unit to receive an image of a user's eye captured by the camera;
 a light emitting unit that includes one or more light emitting elements; and
 a controller to detect a pupil image based on the image of the user's eye and to control the light emitting unit based on the pupil image,
 wherein the controller includes an image processor to detect the pupil image based on the image of the user's eye and to determine a level of illumination corresponding to a size of the detected pupil image by comparing the pupil image with preset first and second reference values,
 wherein the image processor includes:
  an object detector to detect the pupil image from the image of the user's eye,
  an object recognizer to compare the size of the pupil image with the preset first and second reference values, and
  an application unit to determine the level of illumination based on a result of the comparison.

2. The lighting device of claim 1, wherein the object detector detects a plurality of pupil images from a plurality of images of the user's eye, and
 the object recognizer determines an average pupil size of the plurality of pupil images and compares the average pupil size with the preset first and second reference values.

3. The lighting device of claim 1, wherein when the size of the pupil image is greater than or equal to the first reference value, the controller increases the level of illumination from the light emitting unit.

4. The lighting device of claim 1, wherein when the size of the pupil image is less than or equal to the second reference value, the controller decreases the level of illumination from the light emitting unit.

5. The lighting device of claim 1, wherein the controller includes an image processor to detect the pupil image based on the image of the user's eye and to determine a level of illumination corresponding to a position of the detected pupil image by comparing the pupil image with a preset reference value.

6. The lighting device of claim 5, wherein when the position of the pupil image is located above the reference value, the controller increases the level of illumination from the light emitting unit.

7. The lighting device of claim 5, wherein when the position of the pupil image is located below the reference value, the controller decreases the level of illumination from the light emitting unit.

8. The lighting device of claim 5, wherein the image processor includes:
 an object recognizer to compare the position of the pupil image with the reference value;
 an object tracker to determine a change in the position of the pupil image based on a result of the comparison of the position of the pupil image and the reference value; and
 an application unit to determine the level of illumination corresponding to the change in the position.

9. The lighting device of claim 8, wherein the object detector detects a plurality of pupil images from a plurality of images of the user's eye, and
 the object recognizer determines an average position of the plurality of pupil images and compares the average position with the reference value.

10. A lighting system comprising:
 a plurality of lighting devices, each lighting device including one or more light emitting units; and an integrated control module to communicate with a wearable device having at least one camera, the integrated control module to receive an image of a user's eye captured by the camera, to detect a pupil image based on the image, and to control a number of lighting devices to be activated among the plurality of lighting devices based on the pupil image, wherein the integrated control module includes an image processor to detect the pupil image based on the image of the user's eye and to determine a level of illumination corresponding to a size of the detected pupil image by comparing the pupil image with preset first and second reference values, wherein the integrated control module further includes an integrated control module communication unit to communicate with the wearable device and the plurality of lighting devices, and the image processor includes:
  an object detector to detect the pupil image from the image of the user's eye,
  an object recognizer to compare the size of the pupil image with the first and second reference values, and
  an application unit to determine a number of lighting devices to be activated based on the size of the detected pupil image.

11. A wearable device comprising:
a camera to receive an image of a user's eye;
a wireless communication unit to send and receive data by communicating with at least one lighting device; and
a wearable device controller to detect a pupil image based on the image of the user's eye, to generate a control signal for controlling a level of illumination of the lighting device, and to control the wireless communication unit to transmit the control signal to the lighting device,
wherein the wearable device controller includes an image processor to detect the pupil image based on the image of the user's eye and to determine the level of illumination corresponding to a size of the detected pupil image by comparing the pupil image with preset first and second reference values, wherein the image processor includes:
  an object detector to detect the pupil image from the image of the user's eye,
  an object recognizer to compare the size of the pupil image with the first and second reference values, and
  an application unit to determine the level of illumination corresponding to a result of the comparison.

12. The wearable device of claim 11, wherein the camera obtains a plurality of images of the user's eye,
the object detector detects a plurality of pupil images from a plurality of images of the user's eye, and
the object recognizer determines an average pupil size of the plurality of pupil images and compares the average pupil size with the first and second reference values.

13. The wearable device of claim 11, wherein the image processor to determine the level of illumination corresponding to a position of the detected pupil image by comparing the pupil image with a reference value.

14. The wearable device of claim 13, wherein the image processor includes:
  the object detector to detect the pupil image from the image of the user's eye;
  the object recognizer to compare the position of the pupil image with the reference value;
  an object tracker to determine a change in the position of the pupil image based on a result of the comparison of the position of the pupil image and the reference value; and
  an application unit to determine the level of illumination corresponding to the change in the position.

* * * * *